US009830266B1

United States Patent
Yu et al.

(10) Patent No.: US 9,830,266 B1
(45) Date of Patent: *Nov. 28, 2017

(54) TECHNIQUES FOR DATA PREFETCHING

(71) Applicant: EMC IP Holding Company LLC, Hopkinton, MA (US)

(72) Inventors: Rong Yu, Franklin, MA (US); Orit Levin-Michael, Irvine, CA (US); John W. Lefferts, Sutton, MA (US); Pei-Ching Hwang, Shrewsbury, MA (US); Peng Yin, South Grafton, MA (US); Yechiel Yochai, Lincoln, RI (US); Dan Aharoni, Brookline, MA (US); Qun Fan, Northborough, MA (US); Stephen Richard Ives, West Boylston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/156,678

(22) Filed: Jan. 16, 2014

Related U.S. Application Data

(63) Continuation of application No. 12/004,300, filed on Dec. 20, 2007, now Pat. No. 8,667,224.

(51) Int. Cl.
*G06F 12/00* (2006.01)
*G06F 12/0862* (2016.01)

(52) U.S. Cl.
CPC ............... *G06F 12/0862* (2013.01)

(58) Field of Classification Search
CPC .................................... G06F 12/0862
USPC ................. 711/E12.004, 137, 118
See application file for complete search history.

(56) References Cited

U.S. PATENT DOCUMENTS

| 6,253,289 | B1 * | 6/2001 | Bates et al. ................ 711/137 |
| 6,405,284 | B1 * | 6/2002 | Bridge ........................ 711/114 |
| 6,581,112 | B1 * | 6/2003 | Kallat et al. ................. 710/22 |
| 2003/0196040 | A1 * | 10/2003 | Hosogi et al. ............. 711/128 |
| 2005/0027928 | A1 * | 2/2005 | Avraham et al. .......... 711/103 |

* cited by examiner

*Primary Examiner* — Larry T MacKall
(74) *Attorney, Agent, or Firm* — Muirhead and Saturnelli, LLC

(57) ABSTRACT

Described are techniques for processing a data operation in a data storage system. A front-end component of the data storage system receives the data operation. In response to receiving the data operation, the front-end component performs first processing. The first processing includes determining whether the data operation is a read operation requesting to read a data portion which results in a cache miss; and if said determining determines that the data operation is a read operation resulting in a cache miss, performing read miss processing. Read miss processing includes sequential stream recognition processing performed by the front-end component to determine whether the data portion is included in a sequential stream.

20 Claims, 13 Drawing Sheets

TECHNIQUES FOR DATA PREFETCHING

CROSS REFERENCE TO RELATED APPLICATIONS

This application is a continuation of U.S. patent application Ser. No. 12/004,300 (pending), filed on Dec. 20, 2007, entitled TECHNIQUES FOR DATA PREFETCHING, which is incorporated by reference herein.

BACKGROUND

Technical Field

This application generally relates to data storage, and more particularly to techniques used in connection with data prefetching operations in a data storage system.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes (LVs). The logical disk units may or may not correspond to the actual disk drives. Allowing multiple host systems to access the single storage device unit allows the host systems to share data stored therein.

A data storage system may perform data prefetching operations. Data prefetching relates to obtaining data from a device prior to receiving an actual request for the data, such as a request from a host. Data prefetching techniques try to identify or recognize a pattern of I/O requests in a stream in order to try and predict what data will be requested next and prefetch data based on such prediction. One pattern is a sequential I/O stream. Data prefetching techniques may observe received I/O requests to try and identify a sequential I/O stream. A sequential I/O stream may be characterized as a sequence of I/O requests accessing data sequentially from a requester's point of view. A sequential I/O stream involves operating on one data portion, such as a track, immediately after the preceding one or more tracks of data in the stream. By identifying a usage pattern which is a sequential stream in connection with issued I/O requests, data prefetching techniques try and predict what data will be requested next and, accordingly, prefetch the data. For example, a data prefetching technique may observe a number of recently received I/O requests to try and identify a sequential I/O stream. If such a sequence is identified, the data prefetching technique may then obtain the next one or more data portions which are expected in the sequence prior to the data portions actually being requested.

Existing data prefetching implementations may have a problem recognizing sequential I/O streams due to the complexity of data storage configuration with multiple layers of logical device mappings in the data storage system, RAID striping, and the like. Not all of the information needed to recognize a sequential I/O stream may be available to the component in the data storage system performing the recognition and associated prefetch processing. In a data storage system such as by EMC Corporation, a backend disk adapter (DA) or director as included in a disk controller may read and write data to the physical devices. The DA may implement the data prefetching technique and perform processing to recognize a sequential I/O stream. The DA may only have access to information regarding the LV to physical device mappings and may otherwise not have access to information regarding other logical mappings and logical entities, as defined on the data storage system, which may be referenced in a host I/O request. As such, the DA may not be able to properly recognize a sequential I/O stream from the requester's (e.g., host's) point of view in order to trigger any appropriate prefetch processing. As an example, a data storage system may define a metavolume which consists of multiple LVs. The metavolume appears to the host as a single logical device that may be used in connection with the host's I/O requests. A host may issue I/O requests to consecutive tracks of data on the metavolume in which the consecutive tracks span two LVs. The foregoing may be a sequential I/O stream when evaluated across the two LVs in the context of the metavolume. However, the DA may not have knowledge regarding the metavolume and, thus, not recognize the foregoing sequential stream to trigger any appropriate prefetch processing.

Existing data prefetching techniques may also include inefficiencies. For example, in one existing implementation, the DA may maintain a list of information with an entry in the list for each I/O task the DA is servicing. In connection with determining whether to prefetch additional data subsequent to an initial prefetch, the DA may continuously evaluate each entry on the list to determine whether to perform additional prefetching for the associated task. Such polling of the list may be time consuming and reduce the amount of time and data storage system resources available to perform data prefetching.

As such, it may be desirable to utilize an efficient data prefetching technique with improved recognition of sequential patterns of I/O requests.

SUMMARY OF THE INVENTION

In accordance with one aspect of the invention is a method for processing a data operation in a data storage system comprising: receiving, by a front-end component of the data storage system, the data operation; and in response to receiving the data operation, performing first processing by the front-end component, said first processing including: determining whether the data operation is a read operation requesting to read a data portion which results in a cache miss; and if said determining determines that said data operation is a read operation resulting in a cache miss, performing read miss processing, said read miss processing including sequential stream recognition processing performed by said front-end component to determine whether said data portion is included in a sequential stream. The front-end component may receive the data operation from a host. The front-end component may be a fibre-channel adapter. The sequential stream recognition processing may include: determining whether each of one or more data portions occurring immediately prior to data of said read operation is in cache; if each of said one or more data portions is not in cache, determining that no sequential stream exists; and if each of said one or more data portions is in cache, determining an occurrence of a sequential stream, said sequential stream including said one or more data portions and said data portion from said read operation resulting in said cache miss. The one or more data portions may be a number of data portions selected in accordance with a selected sequence length. The step of determining whether each of one or more data portions occurring immediately prior to said data of said read operation is in cache may include examining one or more indicators included in a table, said table including an entry associated with each of said one or more data portions, said entry including an indicator indicating whether a cache slot is associated with said each data portion, and wherein said step of determining whether each of one or more data portions is in cache may include, for each data portion associated with a cache slot, examining a bitmap in a header of said cache slot, said bitmap indicating what data of said each data portion is stored in said cache slot. The method may also include performing, by the front-end component: if no sequential stream is recognized, said front-end component instructs a back-end component to obtain data requested in connection said read operation causing said cache miss, said back-end component retrieving data portions from physical devices of said data storage system. The method may also include performing, by the front-end component: if a sequential stream is recognized, said front-end component performing processing, said processing including: determining a number of one or more data portions to prefetch, said one or more data portions being included in said sequential stream immediately following said data of said read operation; and instructing a back-end component to obtain said data of said read operation which is not in cache and said number of one or more data portions, said back-end component retrieving data portions from physical devices of the data storage system and storing said retrieved data portions in cache. If a sequential stream is recognized, said front-end component may instruct said back-end component to update one or more one cache slot headers each associated with a data portion which said back-end component is instructed to obtain in connection with said instructing. The front end component may instruct said back end component to update each of said one or more cache slot headers with information used by said front end component in determining an amount of data to prefetch. If a sequential stream is recognized, said front-end component may instruct said back-end component to update one or more prefetch indicators, each of said one or more prefetch indicators being associated with a different one of said data portions being prefetched. The method may also include performing by the front end component: determining whether the data operation is a read operation wherein all data needed to service said read operation is included in cache; and if said determining determines that all data requested in connection with said read operation is in cache, performing read hit processing, said read hit processing including: determining whether a prefetch indicator associated with a first of one or more data portions associated with said read operation is on; and if said prefetch indicator is on, setting said prefetch indicator to off and performing additional processing to determine whether to prefetch additional data. The additional processing to determine whether to prefetch additional data may include said front end component using information included in a cache slot header associated with said first data portion. If the read operation results in a cache hit and said front end component determines that additional data is to be prefetched, the front end component may perform processing including: instructing a back end component to prefetch one or more data portions and store each of said one or more data portions being prefetched in a cache slot; and instructing the back end component to update a cache slot header of each cache slot associated with one of said data portions being prefetched, wherein said cache slot header is updated with information used by the front end component in determining how much additional data to prefetch upon the occurrence of a subsequent cache hit to said one data portion that has been prefetched. The read miss processing performed by the front-end component may include: determining whether a single data portion immediately preceding data of said read operation is associated with a cache slot; if said single data portion is not associated with a cache slot, not recognizing a sequential stream; and if said single portion is associated with a cache slot, determining whether said read operation causing said cache miss is associated with a regular device or a non-regular device, wherein said non-regular device is a device including at least one portion of a stream from said requester's point of view which said back-end component cannot recognize and said front-end component can recognize and otherwise, said device being a regular device; if said read operation is associated with a regular device, said front-end component instructing a back-end component to continue with sequential stream recognition processing, obtain data for said read operation which is not in cache, and prefetch one or more other data portions as determined by said back-end component, wherein said back-end component retrieves data portions from physical devices; and if said read operation is associated with a non-regular device, having said front-end component complete any remaining sequential stream recognition processing and accordingly instructing said back-end component to obtain said data for said read operation which is not in cache and, if a sequential stream is recognized, to also prefetch one or more data portions following said data of said read operation in a detected sequence.

In accordance with another aspect of the invention is a method for processing a data operation in a data storage system comprising: receiving, by a front-end component of the data storage system, the data operation from a requester; and in response to receiving the data operation, performing first processing by the front-end component, said first processing including: determining whether the data operation is a read operation requesting to read a data portion which results in a cache miss; and if said determining determines that said data operation is a read operation resulting in a cache miss, performing read miss processing, said read miss processing including determining whether said read operation is associated with a regular device or a non-regular device, and, if said read operation is associated with a regular device, instructing a back-end component of the data storage system to perform sequential recognition processing and prefetching processing, and otherwise, if said read operation is associated with a non-regular device, said sequential stream recognition processing and prefetch processing being performed by said front-end component, said sequential stream recognition processing determining whether said data portion of said read operation is included in a sequential stream, said prefetch processing including determining an amount of data in a detected sequence to be prefetched, wherein said non-regular device is a device including at least one portion of a stream from said requester's point of view which said back-end component cannot recognize and said front-end component can recognize. The non-regular device may be a device using one or more logical device mappings which are not available for use by said back-end component and which are available for use by said front-end component. The method may also include performing by the front end component: determining whether the data operation is a read operation wherein all data needed to service said read operation is included in cache; and if said determining determines that all data requested in connection with said read operation is in cache, performing read hit processing, said read hit processing including: determining whether a prefetch indicator for a first of one or more data portions associated with said read operation is on; and if said prefetch indicator is on, setting said prefetch indicator to off and performing additional processing to determine whether to prefetch additional data.

In accordance with another aspect of the invention a data storage system comprising a computer readable medium including executable code stored thereon for processing a data operation in a data storage system, the computer readable medium comprising executable code for: receiving, by a front-end component of the data storage system, the data operation; and in response to receiving the data operation, performing first processing by the front-end component, said first processing including: determining whether the data operation is a read operation requesting to read a data portion which results in a cache miss; and if said determining determines that said data operation is a read operation resulting in a cache miss, performing read miss processing, said read miss processing including sequential stream recognition processing performed by said front-end component to determine whether said data portion is included in a sequential stream. The computer readable medium may comprise executable code that performs said sequential stream recognition processing that further includes executable code for: determining whether each of one or more data portions occurring immediately prior to data of said read operation is in cache; if each of said one or more data portions is not in cache, determining that no sequential stream exists; and if each of said one or more data portions is in cache, determining an occurrence of a sequential stream, said sequential stream including said one or more data portions and said data portion from said read operation resulting in said cache miss.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
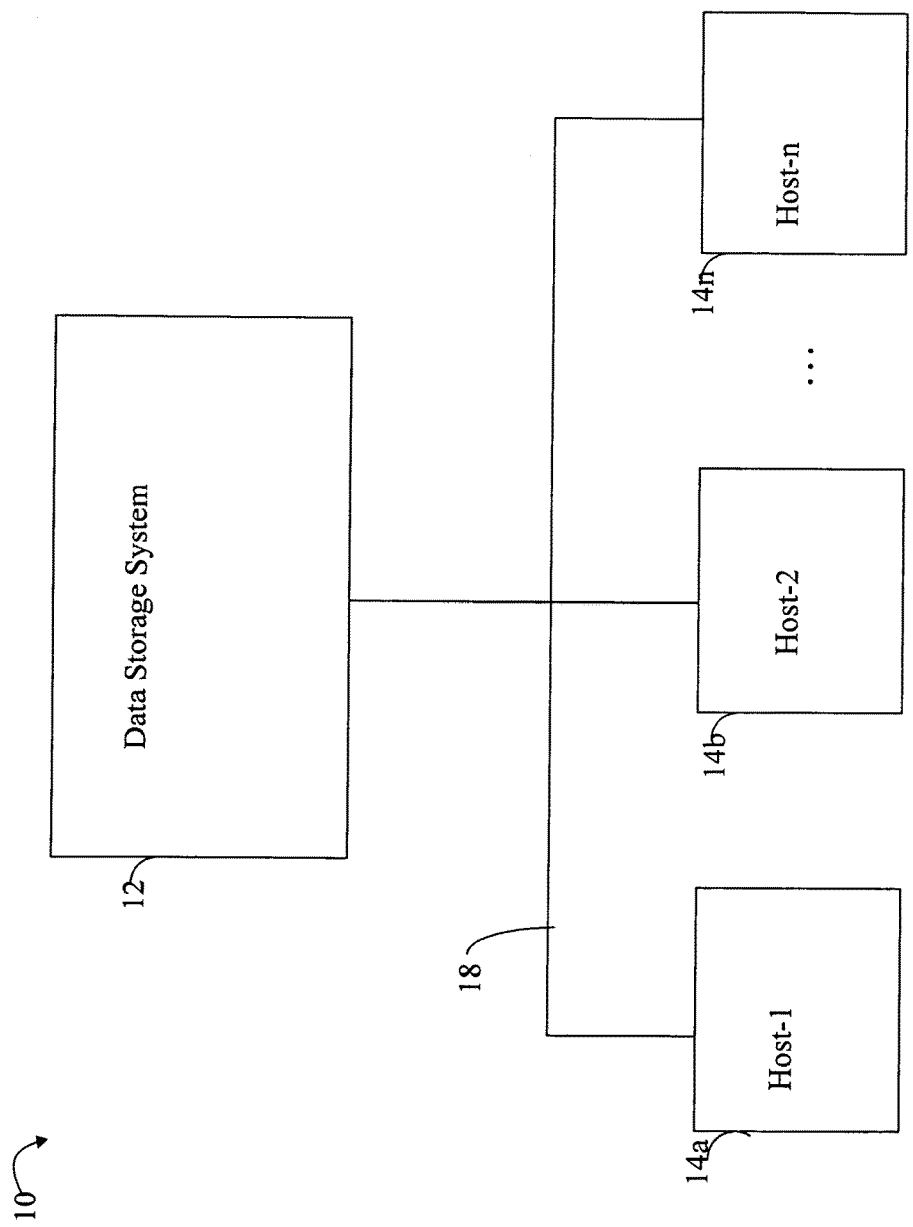
FIG. 1 is an example of an embodiment of a computer system that may utilize the techniques described herein.

Referring to FIG. 1, shown is an example of an embodiment of a computer system that may be used in connection with performing the techniques described herein. The computer system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, iSCSI, and the like. Some or all of the connections by which the hosts, management component(s), and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
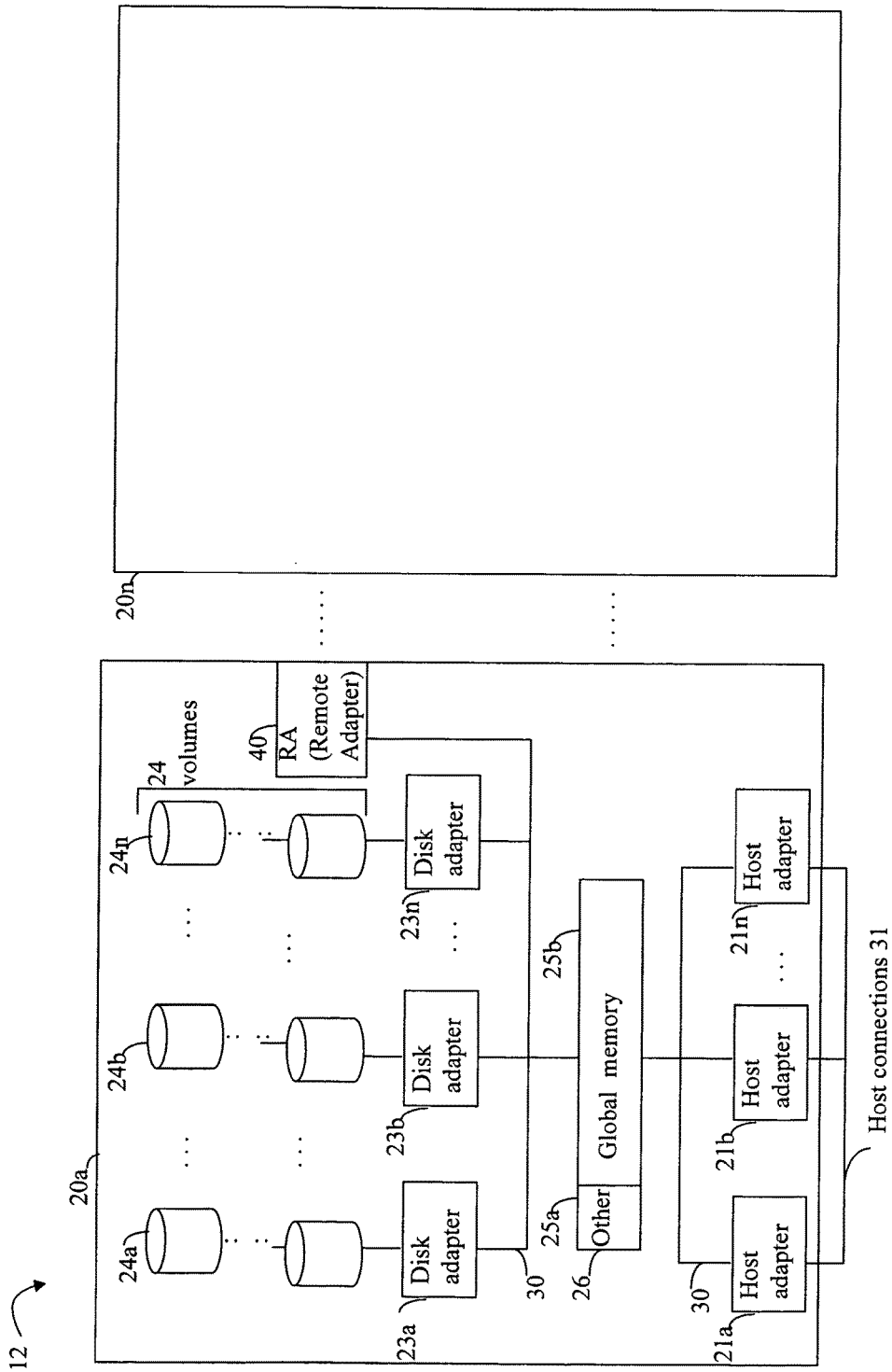
FIG. 2A is an example of an embodiment of a data storage system.

Referring to FIG. 2A, shown is an example of an embodiment of the data storage system 12 that may be included in the computer system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the computer system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication.

One or more internal logical communication paths may exist between the DA's, the remote adapters (RA's), the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive, or multiple drives. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. In the following description, data residing on a LV may be accessed by the DA following a data request in connection with I/O operations that other directors originate. Data may be accessed by LV in which a single DA manages data requests in connection with the different one or more LVs that may reside on a disk. The DA may accomplish this by creating job records for the different LVs associated with a particular DA. These different job records may be associated with the different LVs in a data structure stored and managed by each DA.

Figure 2B:
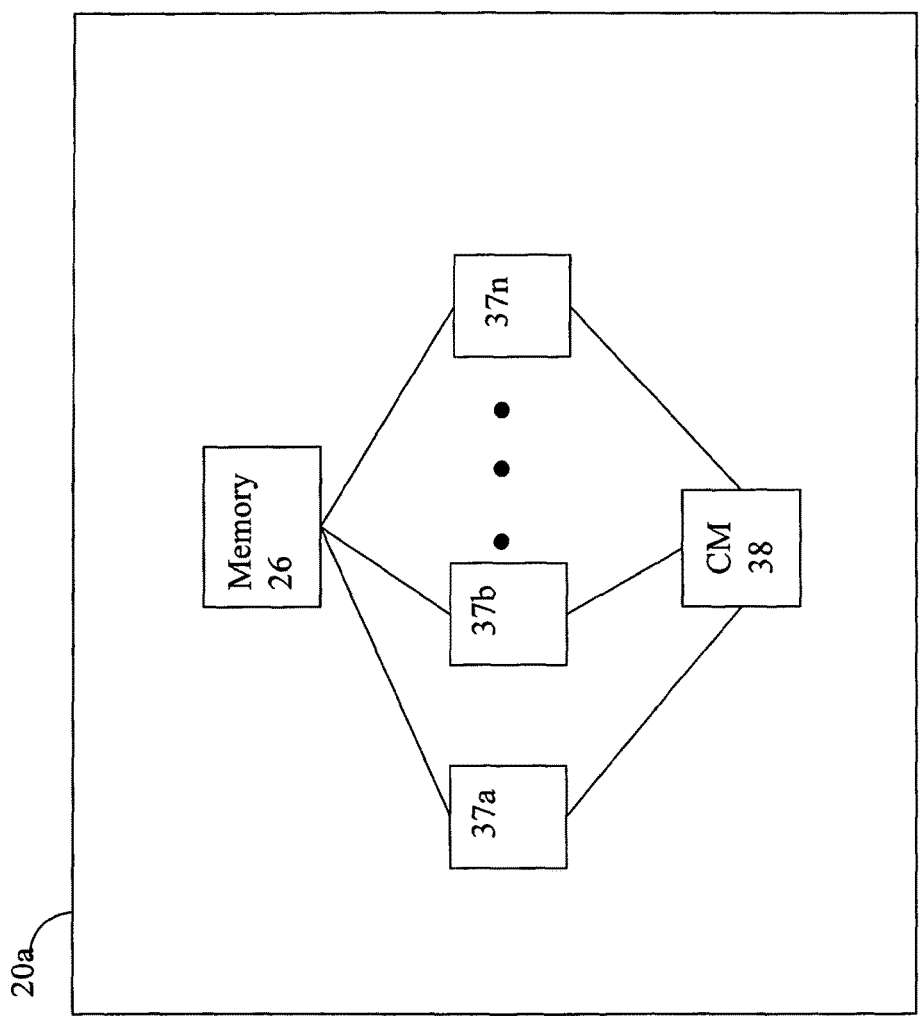
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary.

The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37*a*-37*n*. In addition, a sending one of the directors 37*a*-37*n* may be able to broadcast a message to all of the other directors 37*a*-37*n* at the same time.

With reference back to FIG. 2A, components of the data storage system may communicate using GM 25*b*. For example, in connection with returning data to a host from one of the devices as part of a read operation, the data may be copied from the device by the appropriate DA servicing the device. The DA may copy the data read into a cache slot included in GM which is, in turn, communicated to the appropriate HA in communication with the host.

As described above, an embodiment may include a cache in the global memory portion 25*b* of FIG. 2. An embodiment may include any one of a variety of different caching data structures and management techniques. Examples of different types of cache arrangements are described, for example, in U.S. Pat. No. 6,807,619, Oct. 19, 2004, ADVANCING BANK POINTER IN PRIME NUMBERS UNIT, Ezra et al., and U.S. Pat. No. 7,143,393, Nov. 28, 2006, METHOD FOR CACHE MANAGEMENT FOR POSITIONING CACHE SLOT, Ezra et al., both of which are incorporated by reference herein. The foregoing are just some examples of cache arrangements that may be used in an embodiment with the techniques herein.

It should be noted that an embodiment may use different techniques in connection with data that is read from, or written to, devices in the data storage system. For example, the cache may be used in connection with processing data for read and write operations. In connection with a read operation, the DA may read the data requested from the device and store it in a cache slot included in cache. The cache slot is described in more detail elsewhere herein. The DA, for example, may obtain a cache slot if there is not already one allocated and associated with a particular data track. The data is read from the physical device by the DA and stored in the cache slot. Indicators associated with the cache slot and other structures may be appropriately updated in accordance with the data operation, the state of the data included in the cache slot, and the like. Data that is to be written to a device may be first stored in a cache slot and the cache slot may be appropriately updated (e.g., marked as a write pending by setting appropriate indicators of the cache slot and other data structures). The data is then actually written out to the physical device at a later point in time.

In connection with performing operations, such as in connection with an I/O operation for a device, a track id table which includes device information may be used.

Figure 3:
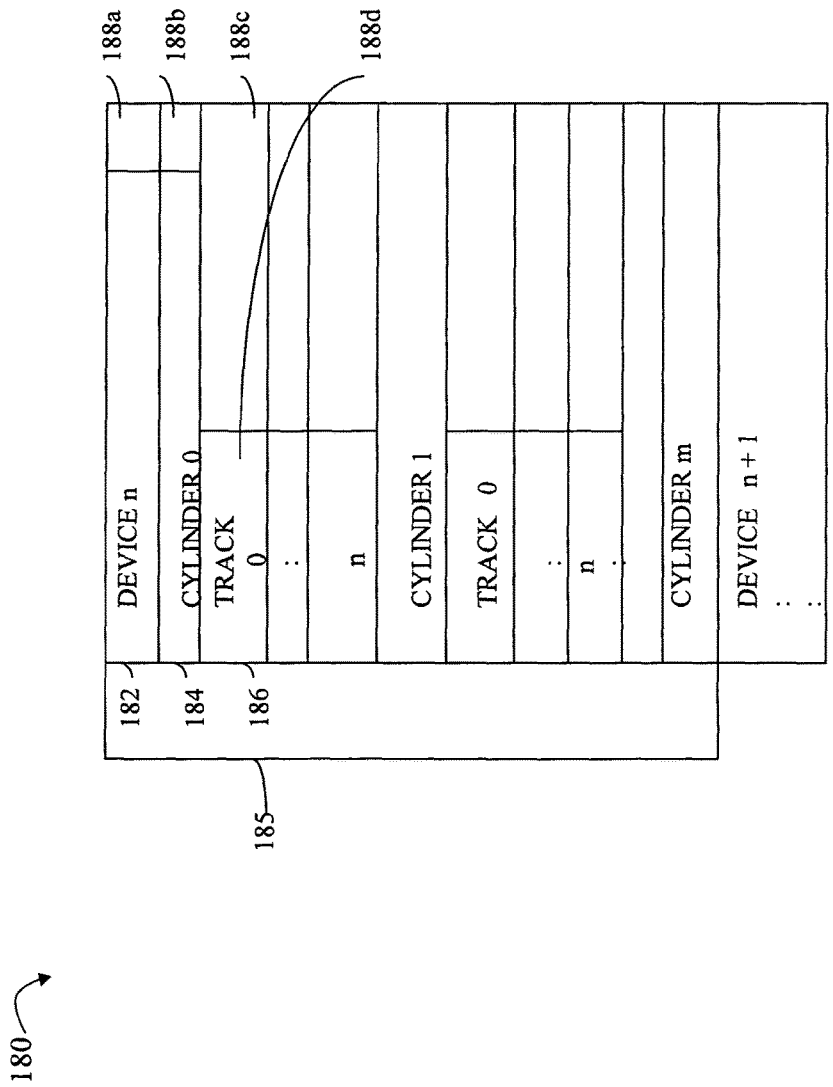
FIG. 3 is an example of an embodiment of a track id table.

Referring to FIG. 3, shown is an example of a representation of a track id table 180. The table 180 may be organized on a device-by-device level to indicate device state information for a particular portion of a device. Such information may include, for example, if the data from the portion is in cache, and if so, where in cache is it located. An embodiment that includes devices, for example, such as disks, may include a further refinement or granularity in the table 180 corresponding to a location in cache. The table 180 may also be used to store other information about each particular track as will be explained in more detail below. The table 180 may be stored as device metadata in a portion of GM as illustrated in other figures herein.

The table 180 may include a hierarchical structure relative to the structure of a disk, such as cylinders and tracks on a disk. In one embodiment, a track may be a 64K byte portion aligned with the beginning of the device and a cylinder may be 15 tracks. Other embodiments may use different structures and/or sizes. Each device, such as device n, may have a corresponding portion 185 included in the table. Each of the portions 185 may further be divided into sections in accordance with the disk structure. A portion 185 may include device header information 182, information for each cylinder 184, and for each track within each cylinder 186. For a device, a bit indicator 188*a* may indicate whether data associated with the device is stored in cache. The bit indicator 188*b* may further indicate for a particular cylinder within a device, is any data stored in the cache. Associated with each track may be a corresponding portion 188*c* which may include information about a particular track. In one embodiment, portion 188*c* may indicate whether data associated with a particular track is in the cache and an associated address of where in the cache the data for a particular track may be found, for example, in connection with performing a read operation or a pending write operation. The portion 188*c* may include other information associated with a particular track, such as a valid cache address if data is stored in the cache for the particular track. The portion 188*c* may also include one or more bit flag indicators and other information related to each device track. The bit flags may include a bit indicator as to whether the track is associated with a cache slot (e.g., "in-cache flag"). The portion 188*c* may also include a bit flag or indicator as to whether the data in the cache slot has been prefetched (e.g., "prefetch indicator"). As described in more detail in following paragraphs, a cache slot may include a header portion and a data portion. For each track associated with a cache slot, information may be included in the header portion of the cache slot indicating what portions data for the track, if any, are actually included in the data portion of the cache slot. In other words, a cache slot may be associated with a track as indicated by the in-cache flag. For the cache slot associated with the track, some, none or all of the data for the track may actually be stored in the cache slot data portion. In one embodiment, the cache slot header may include a bitmap indicating what portions, if any, of data for the associated track are actually stored in the cache slot data portion. In one embodiment, the cache slot data portion may be 64K bytes. The cache slot data portion may be partitioned into 128 pieces or segments (e.g., each piece may correspond to a size or minimum amount of data read from a device). The bitmap indicator may include 128 bits, one bit for each piece, in which the bit for a piece is set when the corresponding data for the piece is in cache. The prefetch indicator, in-cache flag, and bitmap indicator may be used in connection with performing prefetch processing as described in following paragraphs. In particular, the in-cache flag may be examined to determine whether there is a cache slot associated with a track. If so, the particular data of the track which is actually stored in the cache slot data portion may be determined by examining the bitmap indicator of the cache slot header. The in-cache flag and bitmap indicator may be used in connection with determining what data for a read request is in cache. The prefetch indicator may be used in connection with other processing as described in more detail below.

If all the data associated with a read operation is in cache, the read operation may be described as resulting in a cache hit. Otherwise, the read operation may be described as resulting in a cache miss since the read operation cannot be serviced by retrieving all data from the cache. Additional data for the read operation resulting in a cache miss is read from disk to service the read operation. For purposes of the processing and techniques herein, a read operation may be evaluated to determine which one or more tracks of requested data, or portions thereof, are in cache. What will now be described are several conditions or trigger events that may be used in an embodiment in connection with the techniques and processing herein. Such conditions or trigger events may be described in accordance with evaluating whether data of a read operation is in cache.

It should be noted that a request to read data, as may be received from a host by the FA, may be a request to read a single track of data, a portion of a single track of data (e.g., request for less than a single track of data), or data spanning multiple tracks (e.g., request for more than a single track of data or a request for portions of data from multiple tracks). The FA may perform processing to determine whether all the data for the read request is in cache. In one embodiment as described herein, this may be determined by examining the appropriate in-cache flag(s) and bitmap indicator(s) for the one or more tracks of the read request. If all of the data needed to service the read request is not in cache, there is a READ MISS. Otherwise, if all the data needed to service the read request is in cache, there is a READ HIT. Processing that may be performed by the FA in connection with determination of a READ MISS and READ HIT are described in more detail in following paragraphs.

Figure 3A:
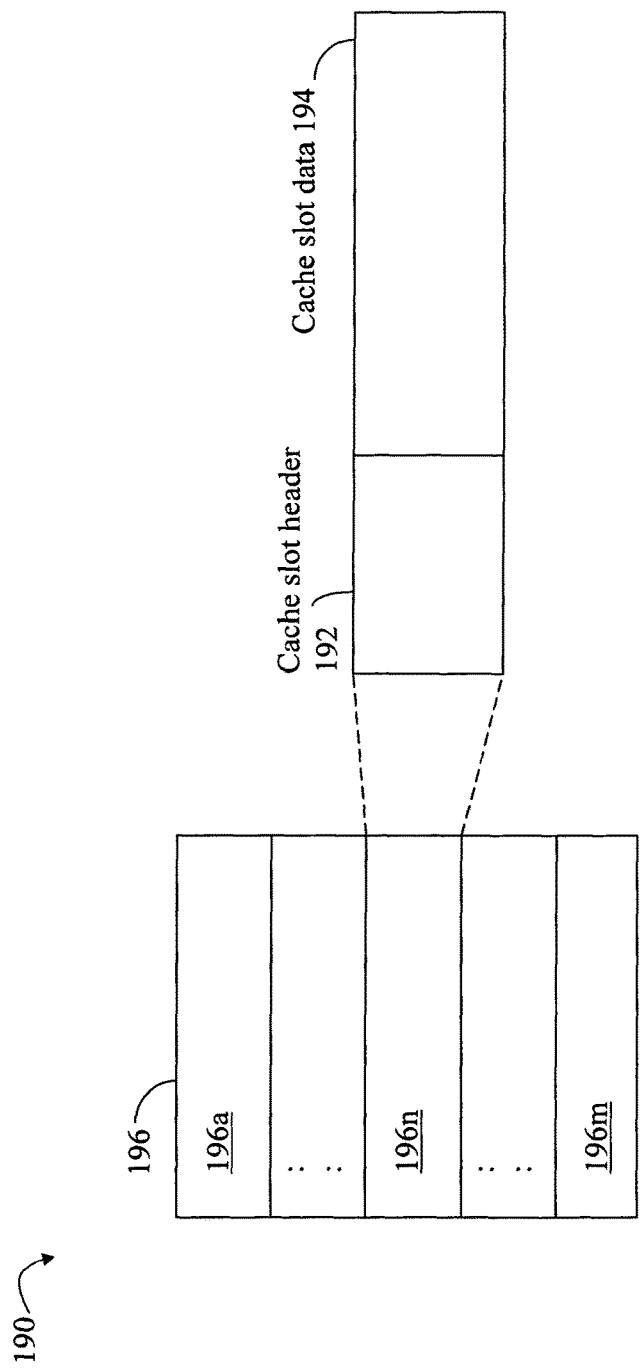
FIG. 3A is an example representation of portions of a cache slot.

Referring to FIG. 3A, shown is an example of a logical representation of a cache including cache slots. The example 190 includes a cache 196 with a plurality of cache slots 196a-196m. It should be noted that the cache 196 may be characterized as a logical representation of the cache since any one of a variety of different arrangements and data structures may be used in an embodiment. Element 196n shows additional detail regarding a cache slot. A cache slot 196n may include a header portion 192 and a data portion 194. The cache slot header 192 may include one or more pieces of information used in connection with cache management. The cache slot data portion 194 may include the cached data, for example, such as a track of data stored in the cache in connection with an I/O operation. The cache slot header 192 may include one or more bit flags or indicators (e.g., such as the bitmap indicator described above) as well as other information as will be described in more detail herein. Such other information may be used in connection with performing prefetch processing as described in following paragraphs. It should be noted that for purposes of illustration, detail of only a single cache slot 196n is shown. However, the other cache slots are similarly arranged.

A data storage system may perform data prefetching operations. Data prefetching relates to obtaining data from a device prior to receiving an actual request for the data, such as a request from a host. Data prefetching techniques try to identify patterns of I/O requests in a stream in order to try and predict what data will be requested next and prefetch data based on such a prediction. One pattern is a sequential I/O stream. Data prefetching techniques may observe received I/O requests to try and identify a sequential I/O stream. A sequential I/O stream may be characterized as a sequence of I/O requests accessing data sequentially from the requester's point of view. A sequential I/O stream involves operating on one data portion, such as a track, immediately after the preceding one or more tracks of data in the stream. By identifying a sequential stream in connection with issued I/O requests, data prefetching techniques try and predict what data will be requested next and, accordingly, prefetch the data. For example, a data prefetching technique may observe a number of recently received I/O requests to try and identify a sequential I/O stream. If such a sequence is identified, the data prefetching technique may then obtain the next one or more data portions which are expected in the sequence prior to the data portions actually being requested. In one embodiment as described in more detail in following paragraphs, a sequential I/O stream is detected by determining whether data tracks of the sequential I/O stream are in cache via examination of the appropriate in-cache bit flags in the track id table entries and the bitmap indicators for the data tracks. Other embodiments may use other techniques in connection with detection of a sequential I/O stream.

Existing data prefetching implementations may have a problem recognizing sequential I/O streams due to the complexity of data storage configuration with multiple layers of logical device mappings in the data storage system, RAID striping, and the like. Not all of the information needed to recognize a sequential I/O stream may be available to the component in the data storage system performing the recognition and associated prefetch processing. In a data storage system such as by EMC Corporation, the backend disk adapter (DA) or director as included in a disk controller may read and write data to the physical devices. The DA may implement the data prefetching technique and perform processing to recognize a sequential I/O stream. The DA may only have access to information regarding the LV to physical device mappings and may otherwise not have access to information regarding other logical mappings and logical entities, as defined on the data storage system, which may be referenced in a host I/O request. As such, the DA may not be able to properly recognize a sequential I/O stream from the requester's (e.g., host's) point of view in order to trigger any appropriate prefetch processing. As an example, a data storage system may define a metavolume which consists of multiple LVs. The metavolume appears to the host as a single logical device that may be used in connection with the host's I/O requests. A host may issue I/O requests to consecutive tracks of data on the metavolume in which the consecutive tracks span two or more LVs. The foregoing may be a sequential I/O stream when evaluated across the two or more LVs in the context of the metavolume. However, the DA may not have knowledge regarding the metavolume and, thus, not recognize the foregoing sequential stream to trigger any appropriate prefetch processing.

As such, what will now be described is an embodiment using the techniques herein in which the FA performs processing in connection with sequential I/O stream recognition and prefetching. In connection with the techniques herein, the FA plays an increased role in sequential I/O stream recognition and prefetch processing while also limiting the adverse impact on other FA activities such as, for example, read hit response time and I/O throughput.

It should be noted that the FA may be referred to in connection with illustrative examples of the techniques herein. However, an embodiment may include another type of front end component of the data storage system besides the FA which interfaces with the host (e.g., such as receiving host I/O requests) for use with the techniques herein.

As described herein, the data storage system may provide a first mapping layer which maps one or more physical storage devices or drives, or portions thereof, to each LV or logical device. The data storage system may also provide additional mapping layers which are used to define other logical devices or entities which may be presented to the host for use. These additional mapping layers may map one or more LVs to other logical entities or devices. As an example, the data storage system may provide a second additional mapping layer which maps multiple LVs, or portions thereof, to another second level logical device or volume. The second level logical device may be presented to the host as a single host device or host volume consisting of multiple LVs, or portions from multiple LVs.

A regular device may be defined as a logical device or volume which, from the host's point of view, is associated with only a single LV and utilizes only the first mapping layer on the data storage system. In other words, I/O requests received from a host which are in terms of LV and location (s) within the LV (e.g., offset) refer to a regular device or regular volume. If a logical device or volume referenced in an I/O request from the host is not a regular device or volume, then the logical device or volume is characterized as non-regular. A non-regular device or volume may be defined as a logical device or volume which utilizes another mapping layer other than the forgoing first mapping layer (e.g., mapping between LVs and physical devices or drives).

It should be noted that, for purposes of illustration, the foregoing provides an example of a non-regular device which uses the first mapping layer and only a second additional mapping layer. However, an embodiment may use more than two mapping layers on the data storage system in connection with non-regular devices.

Examples of a non-regular device or volume may include a metavolume which is a concatenation of multiple LVs to form the single metavolume that looks to the host like a single LV. Other examples of non-regular devices or volumes are virtual devices, and thin devices. Virtual devices are described in more detail in U.S. patent application Ser. No. 10/120,016, filed Apr. 10, 2002, VIRTUAL STORAGE DEVICES, Vishlitsky, et al, which is incorporated by reference herein. Thin devices are described in more detail in U.S. patent application Ser. No. 11/726,831, filed Mar. 23, 2007, AUTOMATED INFORMATION LIFE-CYCLE MANAGEMENT WITH THIN PROVISIONING, Yochai, and U.S. patent application Ser. No. 11/903,869, filed Sep. 25, 2007, DATA DE-DUPLICATION USING THIN PROVISIONING, Veprinsky et al., both of which are incorporated by reference herein.

In one embodiment of a data storage system as described herein, the DA may have access to information regarding the foregoing first mapping layer for the LV to physical device mapping. Information regarding any additional logical device mappings (i.e., such as mapping LVs to/from other logical entities for virtual devices, metavolumes, thin devices) may not be available to the DA even though the additional logical devices may be presented and used by the host in connection with I/O requests. As an example in which the non-regular device in a host I/O request is a metavolume as described above, information regarding the metavolume is not available to the DA. As such, a DA is able to map I/O requests for regular devices or volumes back to the host's device point of view (e.g. to the device or volume referenced in the I/O request received from the host). However, the DA is not able to map I/O requests for the non-regular device which is a metavolume back to the host's device point of view.

Because information regarding the non-regular devices is not available to the DA, the DA is not able to recognize sequential streams for a non-regular device. Information regarding the additional mappings and logical devices as used in connection with non-regular devices may be available for use by the FA or other front end director which communicates with the host and receives I/O requests. As such, the FA has access to the information needed to perform sequential stream recognition and prefetch processing for both regular and non-regular devices as set forth in detail below.

As described above, the FA may be characterized as a front end director of the data storage system. The DA may be characterized as a back end director of the data storage system. In connection with the techniques herein described in following paragraphs, the FA performs processing to recognize sequential I/O streams. The sequence can be of any fixed or varying length determined in accordance with any one of a variety of different techniques. For example, the FA may look for a sequential stream of length 3. If such a sequential stream is initially determined by the FA, prefetch processing may be performed. Any amount of data may be prefetched as determined using any one of a variety of different techniques. In the embodiment described in following paragraphs, the FA performs sequential stream recognition processing by determining if one or more tracks associated with the sequential stream are currently in cache.

In connection with examples set forth in following paragraphs for purposes of illustration of the techniques herein, reference may be made to a read request involving a single track of data, or portion thereof. However, it should be noted that a read request may be made for more than a single track of data, or for data included in more than one track.

Figure 4:
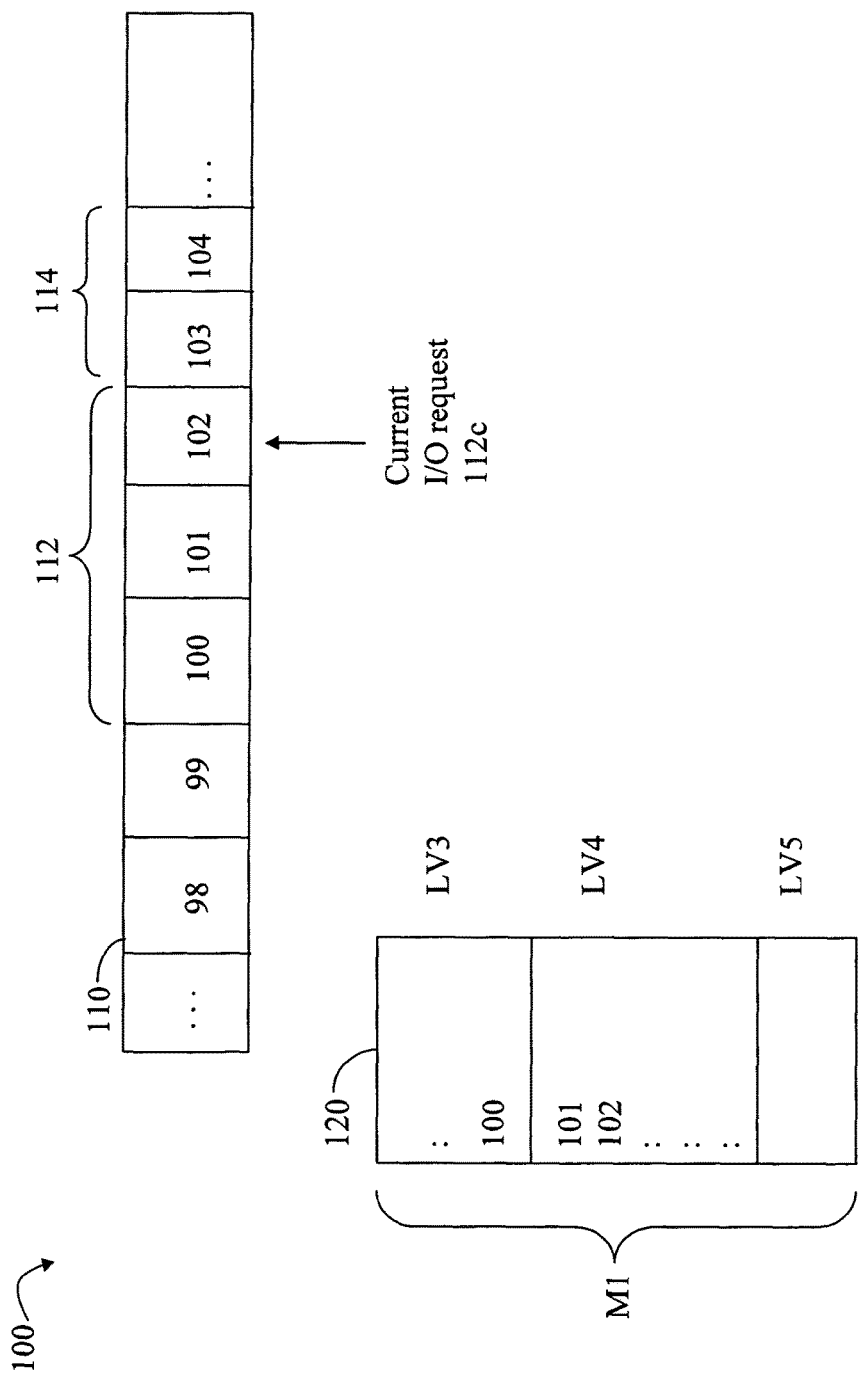
FIG. 4 is an example illustrating use of the techniques herein in connection with sequential stream recognition and prefetch processing.

Referring to FIG. 4, shown is an example illustrating use of the techniques herein as may be performed by the FA in connection with sequential stream recognition and prefetch processing. The example 100 includes a representation 110 of consecutive tracks of data included in a defined metavolume M1. The FA may perform processing to recognize a sequential stream. As an example, a current I/O request for track 102 may be received by the FA resulting in a READ MISS. As a result, the data for the current I/O request needs to be read from the physical device. Prior to reading track 102, the FA may perform sequential stream recognition processing to determine if a sequential I/O stream triggering prefetching exists. If a sequential I/O stream is detected, then additional data tracks besides track 102 may be read from the device. For purposes of illustration, the FA may be looking for sequential streams of 3 data portions. In this example, a data portion may be a track of data although data portion units other than tracks may be used and sequence sizes other than 3 may be used. When an I/O request to read data is received, the FA may look at the current track for the current I/O request and make a determination as to whether the two preceding tracks are in cache. The FA may make this determination by examining information maintained in an embodiment such as the in-cache flag associated with each track of the track id table and bitmap indicator for each cache slot. If the two preceding tracks are in cache, the FA may determine that a sequential stream has been detected.

With reference to FIG. 4, when the current I/O request 112c is received and results in a READ MISS, the FA performs processing to determine if a sequential stream exists by making a determination as to whether tracks 100 and 101 of metavolume M1 are in cache. In this example, tracks 100 and 101 are in cache and element 112 represents the sequential stream detected by the FA. Otherwise, if one or more of tracks 100 and 101 are not in cache, no sequential stream is detected and the FA instructs the DA to obtain the data for the read operation which is not currently in cache causing the READ MISS and store the data in cache. As a variation to the foregoing, an embodiment may look for sequences of 2 data portions rather than 3. In such an embodiment, the FA's sequential stream recognition processing determines whether the single preceding track is in cache and, if so, recognizes a sequence of length 2. It should be noted that the size of the sequence, whether the sequence is a fixed or variable size, and the like, may vary with embodiment.

As illustrated by 120, metavolume M1 may consist of three different LVs—LV3, LV4 and LV5. Information regarding the metavolume may be stored in a table (i.e., included in device metadata) of defined metavolumes. The FA may use the foregoing metadata information when performing processing to recognize sequential I/O streams. Information, such as that regarding the defined metavolumes, may not be available to the DA but is available for use by the FA. As such, the FA is able to recognize 112 as a sequential I/O stream even though it spans multiple LVs. Metavolume M1 may be as described herein which is, from the host's viewpoint, a single logical entity (e.g., device or volume) for which the host can issue requests. The host may issue I/O requests with respect to the metavolume M1 rather than the 3 LVs included therein. In other words, M1 may be visible to the host, but not the individual 3 LVs comprising M1. In order to properly recognize sequential streams, information regarding M1 is available and used by the FA.

When performing READ MISS processing for a read request spanning more than one track, the sequential stream recognition processing (e.g., looking back at a number of previous one or more data tracks and determining whether such one or more data tracks are in cache) may be performed with respect to the first track of the read request data.

Once a sequential I/O stream has been recognized by the FA in response to detecting a READ MISS, prefetch processing of the next one or more tracks of data in the sequence may be performed. This may be the first or initial portion of data prefetched for the recognized sequence. The amount of data prefetched may vary and be determined using any one of a variety of different techniques. For example, an embodiment may always prefetch a fixed number of tracks or may vary the number of tracks prefetched in accordance with a heuristic. With reference to FIG. 4, 2 tracks of data may be prefetched as represented by element 114.

In connection with prefetching the first or initial portion of data upon the occurrence of a READ MISS as described above, the FA may instruct the DA regarding what one or more tracks of data, or portions thereof, to obtain (e.g., data to read from disks or drives), what information to write to the cache slot headers associated with the one or more tracks, and what information to write to the track id table. More specifically, the FA may instruct the DA to obtain the data causing the READ MISS (e.g., data which is currently not in cache and needed to service the current read request) and subsequent data in the recognized sequence to be prefetched. As part of the processing, the DA may also obtain the cache slots and perform any updating of the cache slots to include the data stored therein. The FA may also instruct the DA to store additional information to each of the cache slot headers. Such information may be used, for example, in connection with making a determination as to whether to perform additional prefetching at a later point in time. The FA may also instruct the DA to update the track id table entry for each prefetched track of data by setting the prefetch indicator associated with each prefetched track of data. Note that in one embodiment, the FA may not need to instruct the DA to set the in-cache flags in the track id table or otherwise set the bitmap indicators in any cache slot headers since the DA may update this information as part of normal DA processing when retrieving data from a disk and storing the retrieved data in a cache slot.

At a later point in time, there may be a READ HIT to one of the prefetched tracks of data. The FA may perform processing to determine whether there is a READ HIT in connection with a received read operation. As described herein in one embodiment, such a READ HIT determination may be made by examining the appropriate in-cache flag of each one or more appropriate track id table entries and, for each track having an associated cache slot, the bitmap indicator of the header for the associated cache slot. If the FA detects a READ HIT, the FA may perform processing with respect to one or more tracks associated with the READ HIT. For a READ HIT associated with only a single track, the FA makes a determination as to whether there has been a READ HIT to a prefetched track by determining whether the prefetch indicator associated with the track is on or set. In response to determining a READ HIT to a prefetched data track, the FA may perform additional prefetch processing. This additional prefetch processing includes setting the prefetch flag in the appropriate track id table entry off or to false. Note that this affects subsequent READ HITS to the same track in that the prefetch indicator will now be false. The additional prefetch processing may also include steps to prefetch additional tracks of data related to the sequential I/O stream including the track of the READ HIT. In one embodiment in response to determining a READ HIT to a prefetched data track, one or more additional tracks of data (e.g., the next tracks in the sequence) may be prefetched. The number of tracks prefetched may be a fixed number of tracks. In one embodiment, a determination regarding whether to prefetch any additional data and the amount of data to prefetch may be made without using any information from the cache header. In another embodiment, information related to the sequence or sequential I/O stream may be included in the cache slot header associated with the cache slot experiencing the READ HIT. This information stored in the cache slot may be used to determine whether to prefetch any data at all. Additionally, if data is to be prefetched, the information in the cache slot may also be used to determine how much data to prefetch. Information may include counters related to the sequential I/O stream, position of the cache slot in the recognized sequence, and the like. It should be noted that whether any information is stored in the cache slot header and how that information may be used varies with each embodiment.

If the READ HIT is associated with a read request spanning multiple tracks from a starting track to an ending track, the foregoing just described for a single track READ HIT may be performed for each track commencing with the starting track. Such per track processing may be performed until the occurrence of either the ending track is processed, or processing of one of the multiple tracks results in additional data being prefetched. For example, if a READ HIT occurs for a read request reading tracks 1, 2, and 3, the prefetch indicator of track 1 is examined. If the prefetch indicator of track 1 is currently on, the prefetch indicator of track 1 is turned off and processing is performed to determine whether to prefetch additional data. If additional data is prefetched, no additional prefetch processing is performed for tracks 2 and 3. However, if the prefetch indicator of track 1 is currently off or no additional data is prefetched, the prefetch indicator of track 2 is examined. If the prefetch indicator of track 2 is currently on, the prefetch indicator of track 2 is turned off and processing is performed to determine whether to prefetch additional data. If additional data is prefetched, no additional prefetch processing is performed for track 3. However, if the prefetch indicator of track 2 is currently off or no additional data is prefetched, the prefetch indicator of track 3 is examined. If the prefetch indicator of track 3 is currently on, the prefetch indicator of track 3 is turned off and processing is performed to determine whether to prefetch additional data. If the prefetch indicator of track 3 is currently off, no additional data is prefetched and no further prefetch processing is performed since there are no additional tracks associated with the READ HIT.

In one embodiment, the amount of data prefetched upon the detection of READ HIT to a data track with the prefetch indicator set may vary with the position of the READ HIT data track in the recognized sequence. Information regarding the position of the READ HIT data track may be stored in the cache header of a prefetched slot. The information may include a sequence number relating to the position of the READ HIT data track in the recognized sequence. The FA may instruct the DA to store a sequence number to a cache slot header of each track of prefetched data as part of the processing described above in connection with prefetching for a READ HIT.

Processing steps as just described above that may be performed in an embodiment will be summarized below in connection with FIGS. 5, 6, and 7.

Figure 5:
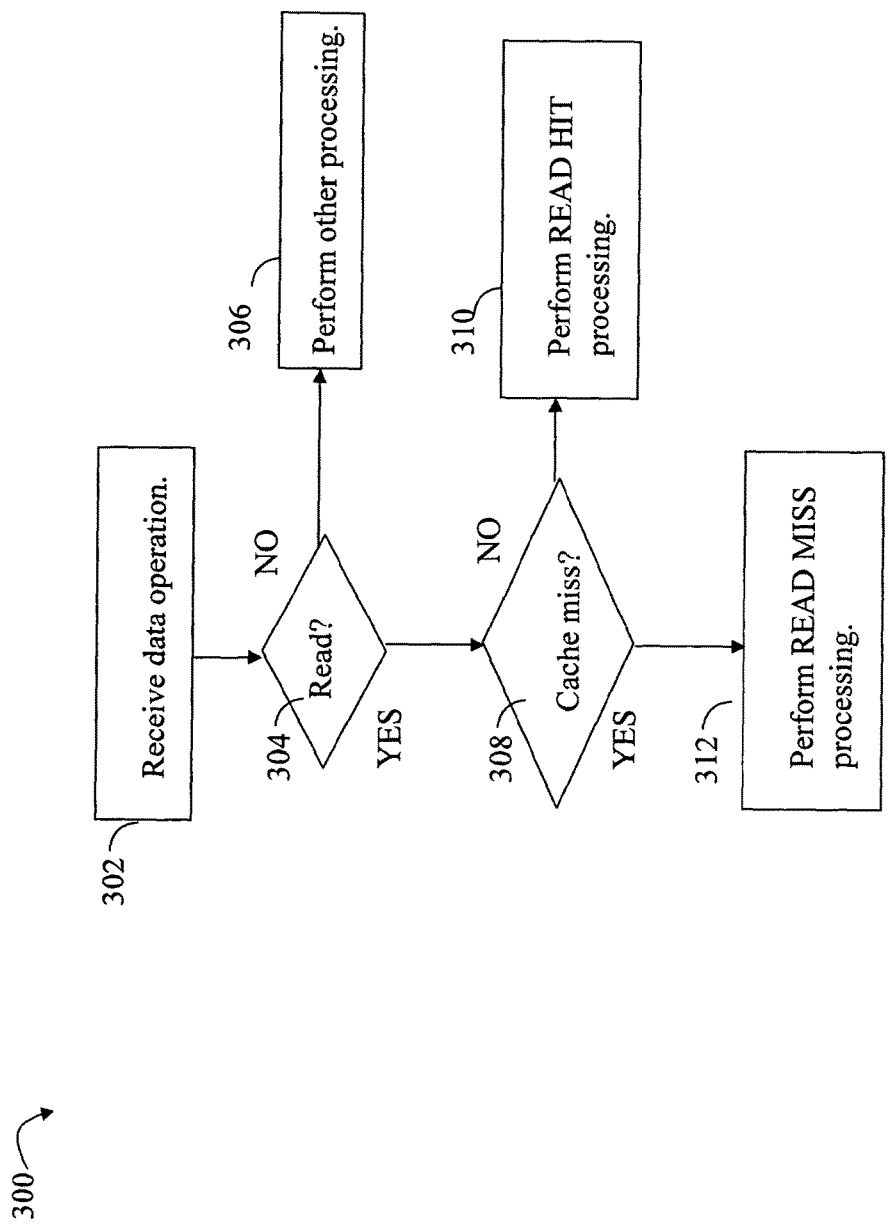
FIGS. 5-7 are flowcharts summarizing processing that may be performed in an embodiment in connection with the techniques described herein for sequential stream recognition and prefetch processing.

Referring to FIG. 5, shown is a flowchart of processing steps that may be performed by the FA in connection with processing a received data operation. At step 302, a data operation may be received at the data storage system. The data operation may be received from a host connected to the data storage system. At step 304, a determination is made by the FA as to whether the data operation is a read I/O operation. If not, control proceeds to step 306 to perform other processing of the data operation. In connection with step 306, the FA as well as other components of the data storage system may perform processing to service the data operation. If step 304 evaluates to yes, control proceeds to step 308 where the FA makes a determination as to whether there is a cache miss for the read operation (e.g., READ MISS detected). As described above, step 308 may be determined by examining the one or more in-cache flags of the appropriate one or more entries in the track id table and, for each such entry associated with a cache slot, bitmap information indicating which data is stored in the cache slot. Using such information, a determination can be made as to whether all of the requested data of the read operation is in cache. If step 308 evaluates to no (e.g., all data of read is in cache resulting in a READ HIT), control proceeds to step 310 to perform READ HIT processing. If step 308 evaluates to yes (e.g., all data of read is not currently in cache resulting in a READ MISS), control proceeds to step 312 to perform READ MISS processing. READ HIT and READ MISS processing of, respectively, steps 310 and 312 are described in following figures. As previously described, if any data needed to service the read request is not stored in cache, there is a READ MISS. Otherwise, there is a READ HIT.

Figure 6:
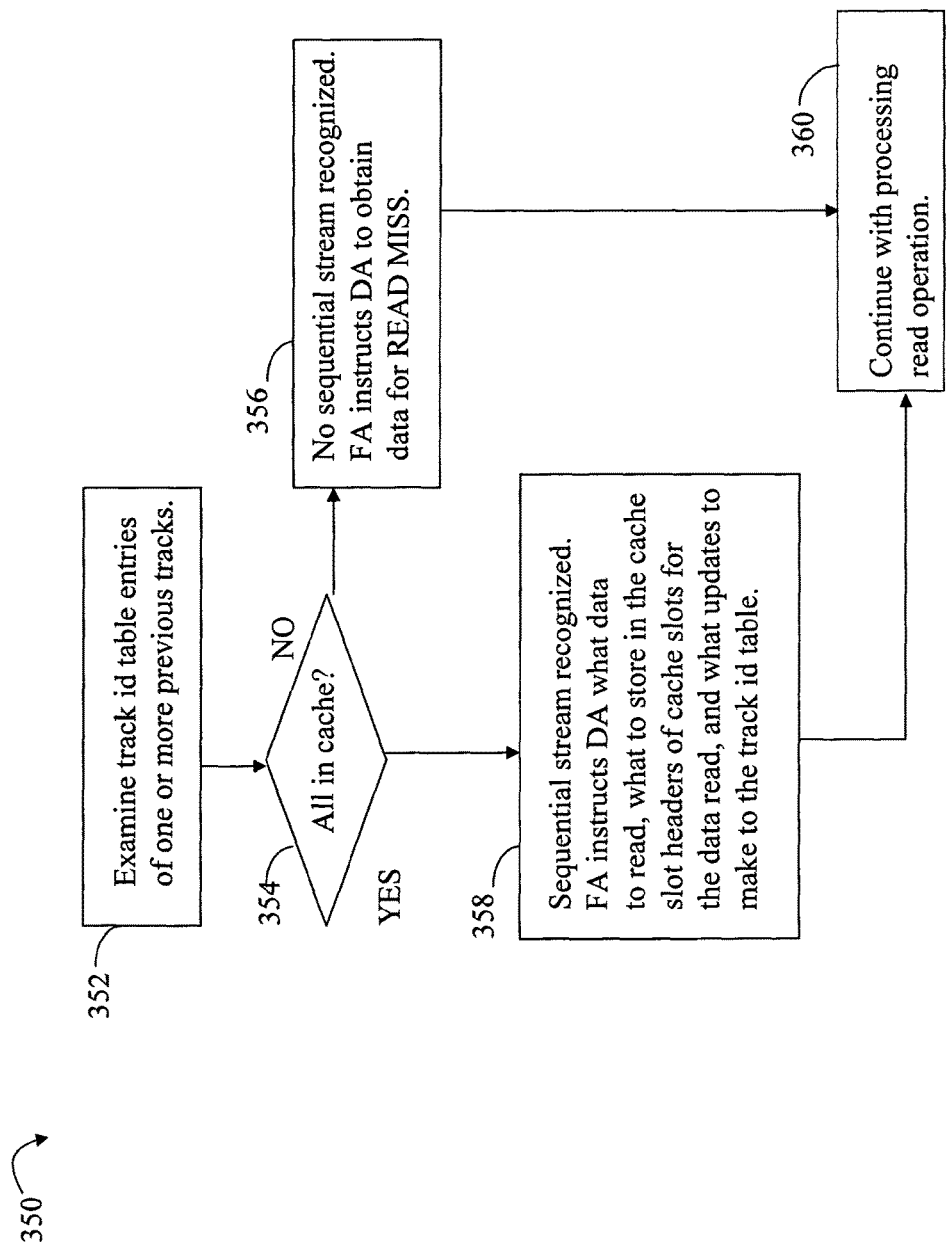

Referring to FIG. 6, shown is a flowchart 350 of processing steps that may be performed in an embodiment in connection with READ MISS processing. Flowchart 350 provides additional detail regarding step 312 of FIG. 5. At step 352, track id table entries associated with one or more data tracks prior to the data of the READ MISS are examined by the FA to determine whether all of the one or more prior data tracks are in cache. It should be noted that in connection with processing of FIG. 6 and other processing steps described herein, the determination of whether a data track is in cache may be made using a variety of different techniques. As described herein, the number of prior tracks examined in step 352 may vary with embodiment in accordance with the number of data tracks to be examined as part of recognizing a sequential stream. If the READ MISS is in connection with a read request spanning multiple tracks, the one or more previous tracks examined in step 352 may be determined with respect to the first or starting track of the data request. At step 354, a determination is made by the FA as to whether all of the previous one or more data tracks from step 352 are in cache. If step 354 evaluates to no, control proceeds to step 356 where the FA makes a determination that no sequential stream is recognized. As part of step 356, the FA instructs the DA to obtain the data for the READ MISS (e.g., data for the read operation determined not to be in cache) from the physical drive(s) or device(s) and store such data in cache. Control proceeds to step 360 where processing in connection with the READ operation continues. If step 354 evaluates to yes, control proceeds to step 358 where the FA makes a determination that a sequential stream is recognized. As part of step 358, the FA provides instructions to the DA regarding what data to read from the drives or devices, what to store in the cache slot headers for the data read, and what updates to make to the track id table. As described above, the FA may instruct the DA to read the data causing the READ MISS and also prefetch one or more data tracks. In turn the DA, as part of its processing, obtains the cache slots, stores the retrieved data tracks requested in the cache slots, and performs processing associated with initializing the cache slots. The FA may also instruct the DA to store information to the cache slot headers of the data read (e.g., such as the prefetched data tracks). This information stored, if any, may be used by the FA in connection with subsequent processing when determining whether to prefetch additional data, and/or how much to prefetch, in response to a subsequent READ HIT to a cache slot having its prefetch indicator set. The FA may also instruct the DA to update the track id table entries of the prefetched data so that the prefetch indicators of such entries are set or on. From step 358, control proceeds to step 360. In connection with step 358, the FA may also instruct the DA to modify or update cache slot headers of other cache slots of data which the FA is instructing the DA to obtain. The particular cache slot headers updated in step 358, the information recorded, and the like, may vary with the embodiment and technique used in sequential stream recognition processing and making a determination about an amount of data, if any, to be prefetched.

Figure 7:
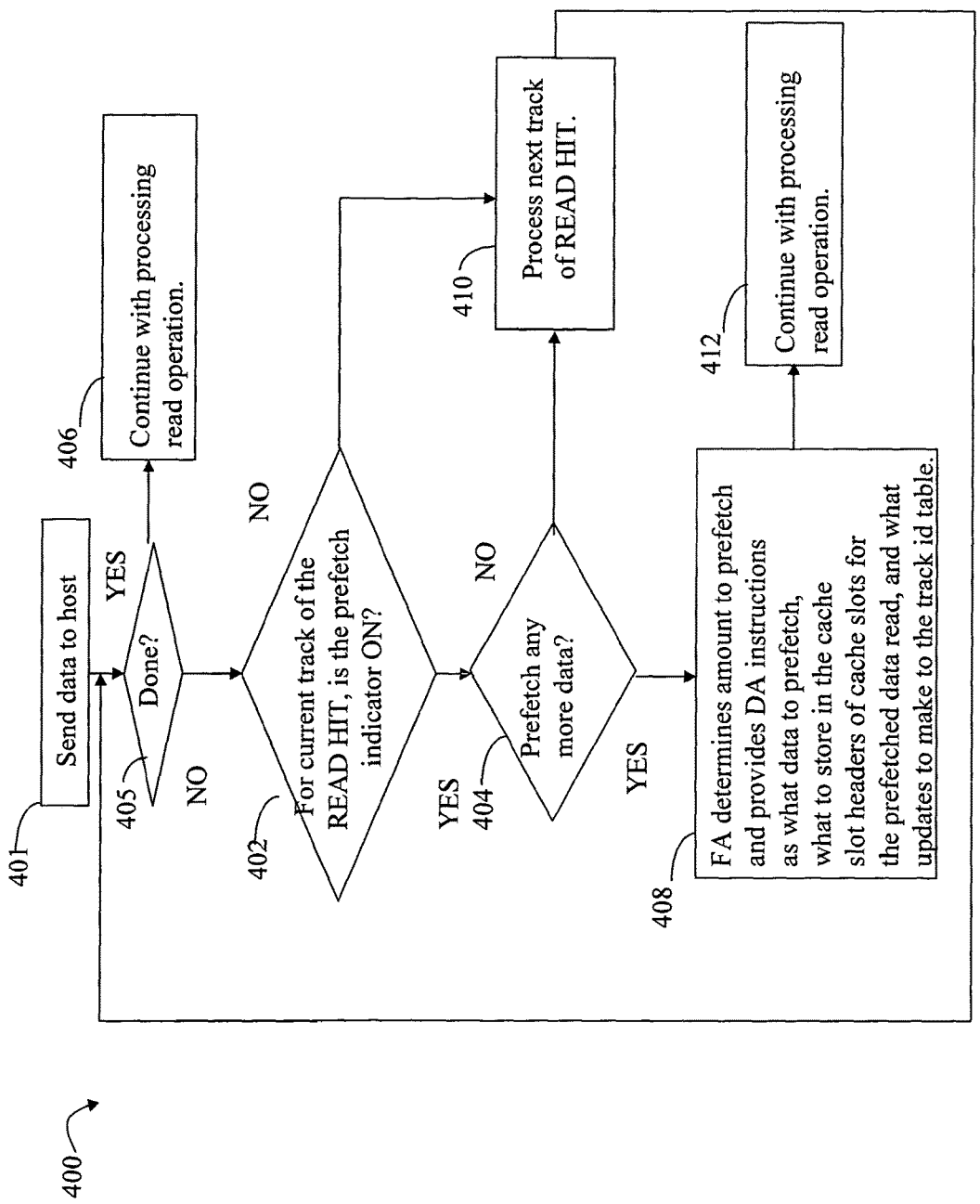

Referring to FIG. 7, shown is a flowchart 400 of processing steps that may be performed in an embodiment in connection with READ HIT processing. Flowchart 400 provides additional detail regarding step 310 of FIG. 5. At step 401, the data which is associated with the READ HIT is retrieved from the cache and sent to the host. At step 405, a determination is made as to whether all tracks associated with the READ HIT have been processed. If so, control proceeds to step 406 to continue other processing for the read operation. Otherwise, if step 406 evaluates to no, control proceeds to step 402 to process the next track associated with the READ HIT. As described elsewhere herein, processing of steps 402, 404, 410, and 408 may be performed for each track associated with the READ HIT until additional data is prefetched, or until all the one or more tracks associated with the READ HIT are processed.

At step 402, a determination is made by the FA as to whether the prefetch indicator for the current data track associated with the READ HIT is set or on. As described above, the prefetch indicator may be included in an entry of the track id table associated with the current track for the READ HIT. If step 402 evaluates to no, no additional prefetching is performed and control proceeds to step 410 to process the next track of the READ HIT. Control proceeds to step 405. If step 402 evaluates to yes for the current track, control proceeds to step 404 where the FA determines whether any additional data is to be prefetched at this point. If not, control proceeds to step 410. Otherwise, if step 404 evaluates to yes, control proceeds to step 408 where the FA determines how much data to prefetch and then provides the DA with instructions. At step 408, the FA instructs the DA as to what one or more additional data tracks to prefetch, what information (if any) should be stored in the cache slot headers of the cache slots including the prefetched data, and what updates to make to the track id table. As described above, the information stored in the cache slot header, if any, may vary with embodiment and may be used in connection with subsequent READ HITs to cache slots including the prefetched data (e.g, subsequent processing of steps 404 and 408). As part of step 408 processing, the FA may also instruct the DA to set the prefetch indicator of the cache slot associated with the current track of the READ HIT to off or false. The FA may also instruct the DA to update the track id table entries of the prefetched data tracks so that the prefetch indicators of such entries are set or on. The FA may use information previously stored in the cache slot header of the current cache slot associated with the READ HIT in connection with steps 404 and 408 to determine whether to perform any prefetching and, if so, how much data to prefetch. Such information may have been previously stored to the cache slot in connection with step 358 and may also be updated at various other times by the DA or other components of the data storage system. The particular information stored, when it may be updated, and how it may be used varies with embodiment. In connection with step 408, the FA may instruct the DA to also update other cache slot headers associated with data the FA instructs the DA to obtain. The particular cache slot headers updated, the information recorded, and the like, may vary with the embodiment and technique used in sequential stream recognition processing and making a determination about an amount of data, if any, to be prefetched. From step 408, control proceeds to step 412 to continue any remaining processing of the read operation.

The foregoing describes an efficient and flexible technique that may be performed by the FA where the FA performs sequential stream recognition processing upon the occurrence of a READ MISS and decides how much data to initially prefetch. The FA provides instructions to the DA including instructions to read the READ MISS data (e.g., data causing the READ MISS which is not in cache) and also prefetch one or more additional data tracks representing the next tracks in the detected sequence. Additionally, in an embodiment in which information may be used by the FA to determine whether to prefetch additional data when there is a READ HIT to a prefetched data track (e.g., prefetch indicator is set), the FA may provide instructions to the DA to store information in the cache slot header of the cache slot associated with a prefetched data track. Due to the logical device information available to the FA, the FA is able to perform sequential stream recognition processing and prefetch processing for both regular and non-regular devices. An example illustrating use of the techniques herein with a non-regular device is described herein in connection with FIG. 4. It will be appreciated by those skilled in the art that the FA has access to and reads the necessary logical device information for use with non-regular devices. For example, when an FA performs processing of FIGS. 5 and 6, the FA may determine whether a device is a non-regular device by examining the appropriate non-regular device information. The FA may use this information in connection with mapping an I/O request for a non-regular device to the particular LV and track to be read by the DA.

As a variation to the foregoing, an embodiment may partition responsibilities associated with sequential stream recognition and prefetch processing between the FA and the DA. An embodiment may partition processing between the FA and the DA in connection with sequential stream recognition and prefetch processing in accordance with whether the device of a received I/O request is regular or non-regular. In such an embodiment, if the device associated with the received I/O request is a non-regular device, the FA may perform processing as described above since the DA does not have sufficient information and knowledge about such I/O requests associated with non-regular devices. If the I/O request is for a regular device, the FA may allocate some of the processing for sequential stream recognition and prefetch processing to the DA as will be set forth below.

A first embodiment of the latter variation will now be illustrated with reference back to FIG. 4 (e.g., when the FA detects a READ MISS with respect to track 102) and with reference to the flowchart of FIG. 8. If the FA detects such a READ MISS, the FA may perform READ MISS processing as set forth in the flowchart 500 of FIG. 8 rather than use the processing steps of FIG. 6. At step 502, the FA examines the track id table entry of a single, immediately preceding track, such as track 101. At step 504, the FA determines whether the single preceding track, such as track 101, is in cache by examining the in-cache flag of the entry from step 502 and, if the in-cache flag is set, the bitmap indicator included in the cache slot for the track. If the preceding track is in cache causing step 504 to evaluate to yes, the FA then determines in step 506 whether the I/O request causing the READ MISS is requesting to read data from a regular device. If step 506 evaluates to no (e.g., the I/O request is associated with a non-regular device), control proceeds to step 508 where the FA completes any remaining sequential stream recognition processing by examining any track id table entries for any remaining preceding tracks. With reference back to FIG. 4, step 508 may include examining track id table entries associated with track 100. As described elsewhere herein, the number of preceding tracks which are examined as part of sequential stream recognition processing varies with embodiment. As also described herein, if the READ MISS is associated with a read request spanning multiple tracks, the recognition processing of step 502 (and also step 514) may be performed with respect to the first track of the read request. From step 508, control proceeds to step 510 where a determination is made as to whether the remaining preceding tracks from step 508 are in cache. If step 510 evaluates to yes, control proceeds to step 518 and then step 516. If step 510 evaluates to no, control proceeds from step 510 to step 512 and then step 516. It should be noted that steps 518, 512 and 516 include performing processing as described, respectively, in steps 358, 356, and 360 of FIG. 6.

If the I/O request is associated with a regular device so that step 506 evaluates to yes, control proceeds to step 514 where the FA requests that the DA continue with any additional recognition processing to detect sequential I/O streams and prefetch as needed. In other words, the FA tells DA to perform sequential stream recognition and any needed prefetching as determined in accordance with DA's technique. Control proceeds to step 516 to continue with processing the read operation.

In the foregoing, the FA examines the first or immediately preceding track with respect to the starting track of the READ MISS. For regular devices, the DA may examine any additional preceding tracks to determine whether the tracks are in cache and thus, recognize a sequential stream. Additionally, for regular devices in which a sequential stream is recognized, the DA determines the amount of data to prefetch in connection with the READ MISS. Accordingly, the DA then reads from disk data causing the READ MISS (e.g., data needed to service the read request which is not in cache) and any prefetched data. If the FA determines that the READ MISS is to read data from a non-regular device, the FA handles the sequential stream recognition processing and determines what data to prefetch, if any.

Figure 8:
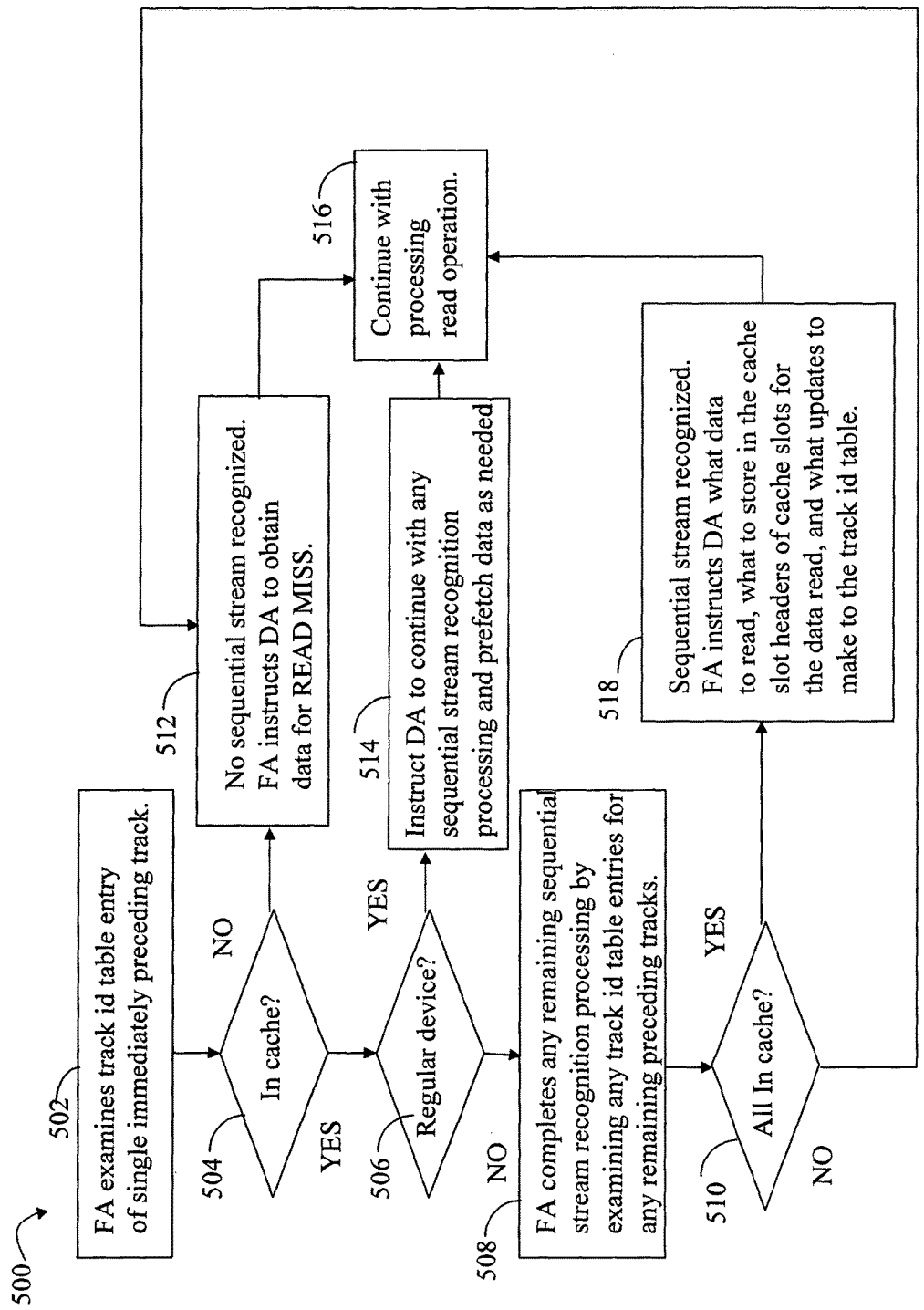
FIG. 8 is a flowchart of processing steps that may be performed in an embodiment as an alternative to the processing of FIG. 6.
Figure 9:
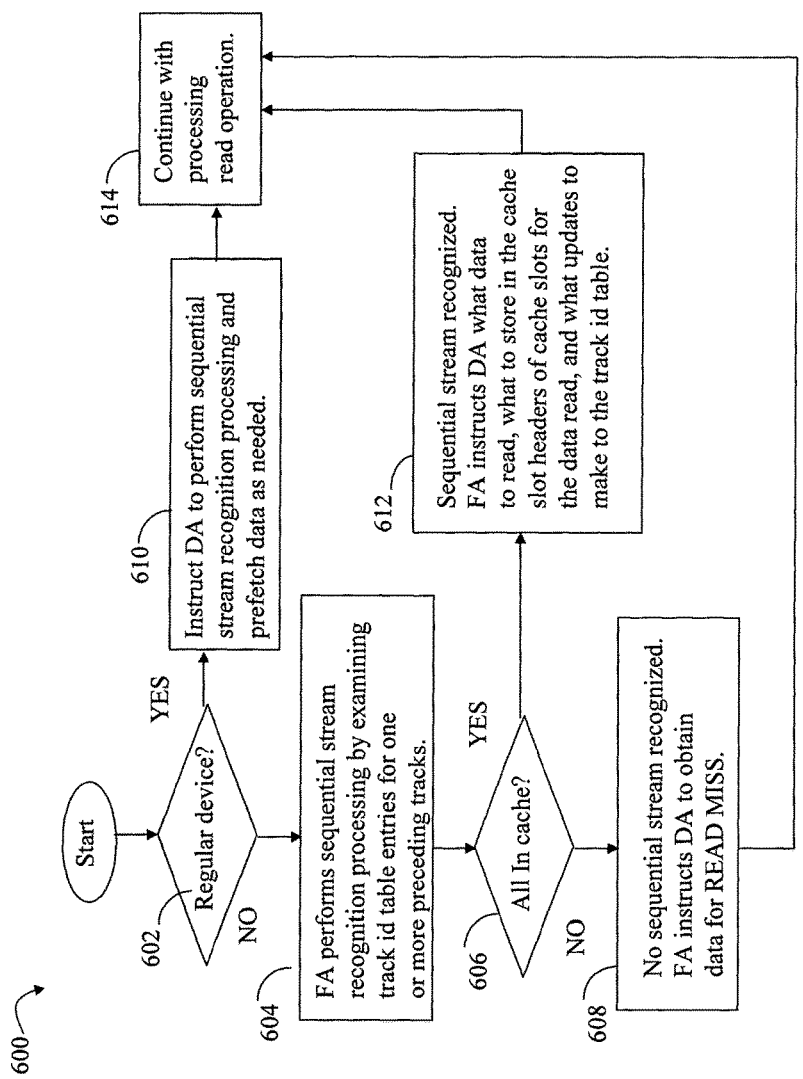
FIG. 9 is a flowchart of processing steps that may be performed in an embodiment as an alternative to the processing of FIG. 6 or FIG. 8.

As a further variation to the processing described in FIG. 8, the FA may not perform any sequential stream recognition processing if the device of the read operation causing the READ MISS is a regular device. Referring to FIG. 9, shown is a flowchart of processing steps that may be performed in such an embodiment. The steps of flowchart 600 are a further variation of the processing steps set forth in flowchart 500 of FIG. 8. The steps of FIG. 9 may be performed in an embodiment rather than perform processing of FIG. 6 or FIG. 8. At step 602, the FA may determine whether the device of the read operation causing the READ MISS is a regular device. If step 602 evaluates to yes, control proceeds to step 610 where the FA instructs the DA to perform sequential stream recognition processing and prefetch data as needed. Control then proceeds to step 614 to continue with processing the read operation. If step 602 evaluates to no, control proceeds to step 604. Steps 604, 606, 608, 612 and 614 perform processing similar to that as described, respectively, in connection with steps 352, 354, 356, 358 and 360 of FIG. 6.

In one embodiment in connection with performing step 514 of FIG. 8 and step 610 of FIG. 9, the DA may utilize a technique for recognition of sequential I/O streams and also prefetching data as described in U.S. Pat. No. 6,721,870, Apr. 13, 2004, Prefetch Algorithm for Short Sequences, Yochai, et al., which is incorporated by reference herein. In the '870 patent, a prefetch process is included in the DA and generates prefetch tasks for short sequences that are no longer than n tracks in length. In one embodiment, the value of n may be selected as 8 though other values may be used. The prefetch process maintains a history of short sequences, uses that history to predict an expected length of a current sequence and generates a short prefetch task based on that prediction. The historical short sequence data is stored in histograms, each histogram being associated with a different LV. The histograms store a cumulative count of sequence occurrences of a given sequence length for each sequence length in a range of 1 track to n tracks. The process applies a probability-based threshold to its prediction to control the aggressiveness of the prefetch task to be generated. The threshold is adjusted based on system activity level metrics, such as processor utilization and average memory access time.

In connection with using the techniques of U.S. Pat. No. 6,721,870 with those described herein, after the DA recognizes a sequential stream, the DA prefetches an amount of data based on the short prefetch statistics. The DA may then update the cache headers with any information that may be used at a later point in time by the FA in connection with a READ HIT to a prefetched cache slot (e.g., FIG. 7 processing). The data stored by the DA in the cache slot header may vary with embodiment and techniques used. The READ HIT processing as described in FIG. 7 may be performed in an embodiment performing the READ MISS processing of FIG. 6, FIG. 8, or FIG. 9.

It should be noted that the techniques described in U.S. Pat. No. 6,721,870 are just one set of techniques that may be used by a DA in connection with performing steps 514 of FIG. 8 and 610 of FIG. 9. The DA may use other techniques in connection with sequential stream recognition and prefetching.

The processing of FIGS. 8 and 9 for READ MISS processing may be used in an embodiment to have the DA perform sequential stream recognition and determine an amount of data to prefetch for regular devices. Additionally, the DA performs processing in connection with processing for non-regular devices as instructed by the FA. The processing of FIGS. 8 and 9 may be used, for example, in embodiments in which the DA utilizes techniques for sequential stream recognition and prefetching that perform well for regular devices. An embodiment may partition the tasks performed by the FA and DA so that the FA performs processing associated with the non-regular devices and the DA performs processing for regular devices.

In connection with an embodiment using processing of FIG. 8 or 9 rather than FIG. 6, the DA's role of sequential stream recognition and determining what data to prefetch, if any, for regular devices ends after the first initial set of tracks are prefetched for READ MISS processing. Any determination regarding whether to prefetch additional data for a READ HIT of one of the tracks prefetched by the DA is made by the FA.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable. This is illustrated in more detail in following figures.

Figure 10:
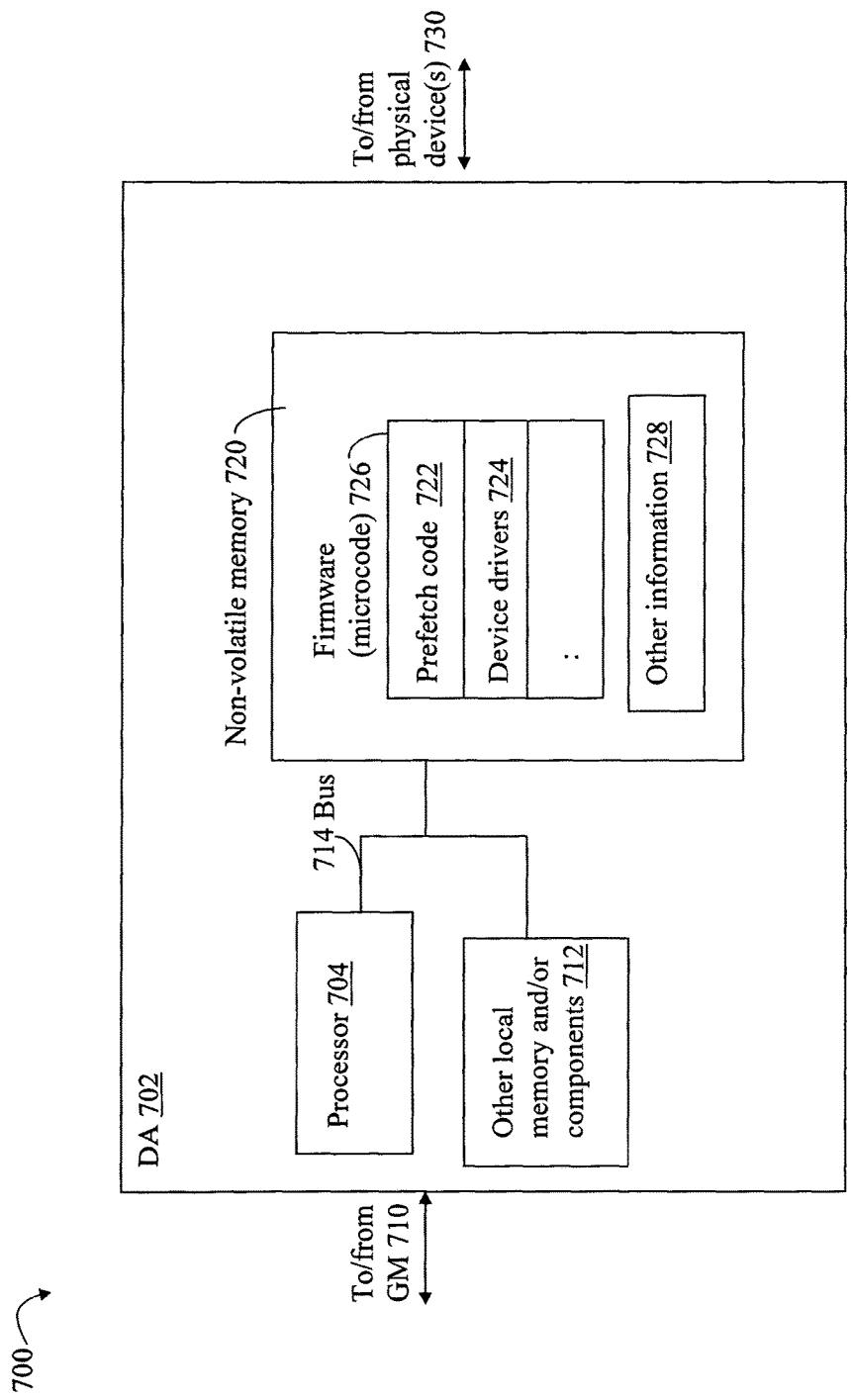
FIGS. 10 and 11 are more detailed examples of directors that may be included in an embodiment using the techniques herein.

Referring to FIG. 10, shown is an example illustrating a DA in more detail as may be included in an embodiment using the techniques herein. The example 700 illustrates a DA 702 including a processor 704, non-volatile memory (NVM) 720 and other local memory and/or components 712 which communicate over an internal bus 714. The components included in 702 may be characterized as local to the DA 702. The DA 702 may communicate with the global memory (GM) as illustrated by 710 and write/read data to/from the physical devices as illustrated by 730. The NVM 720 may include microcode or firmware 726. The firmware 726 may include prefetch code 722, device drivers 724, and other code used by the DA. The prefetch code 722 may include code for performing the processing described herein by the DA. The NVM 720 may also include other information 728, such as code and/or data used by the DA.

Figure 11:
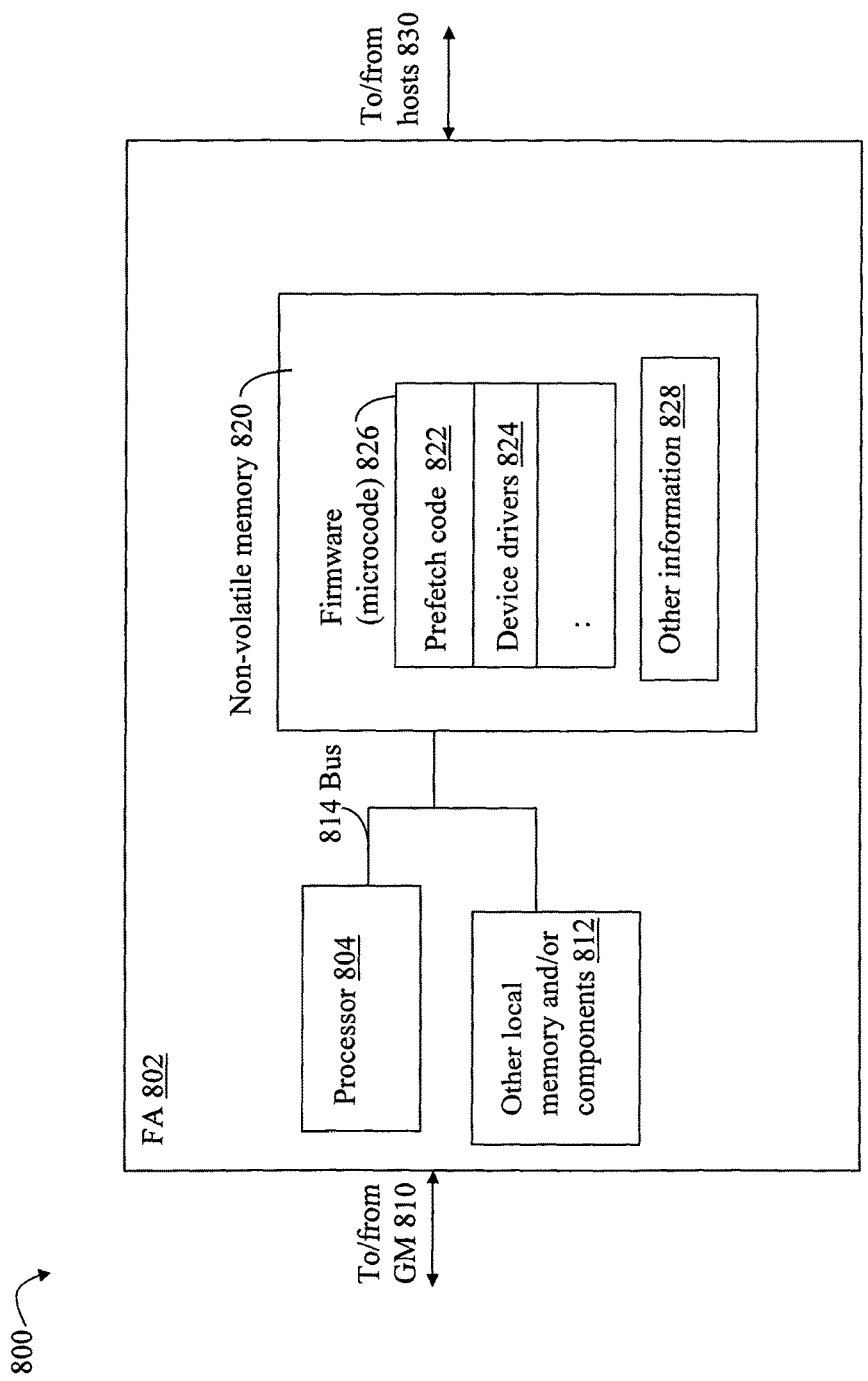

Referring to FIG. 11, shown is an example illustrating a FA in more detail as may be included in an embodiment using the techniques herein. The example 800 illustrates a FA 802 including a processor 804, non-volatile memory (NVM) 820 and other local memory and/or components 812 which communicate over an internal bus 814. The components included in 802 may be characterized as local to the FA 802. The FA 802 may communicate with the global memory (GM) as illustrated by 810 and communicate with the host as illustrated by 830. The NVM 820 may include microcode or firmware 826. The firmware 826 may include prefetch code 822, device drivers 824, and other code used by the FA. The prefetch code 822 may include code for performing the processing described herein by the FA. The NVM 820 may also include other information 828, such as code and/or data used by the FA.

An embodiment may include variations to the foregoing in connection with the techniques described herein for I/O operations spanning multiple tracks. As described above with reference to FIG. 5 for a multiple track I/O operation, a determination regarding whether to perform READ HIT processing (e.g., FIG. 7) or READ MISS processing (e.g., FIG. 6) may be made by examining all tracks in connection with the I/O operation as a single unit so that if all the data is not in cache needed for the I/O operation, READ MISS processing may be performed; otherwise READ HIT processing may be performed.

As a first alternative to the foregoing involving I/O operations spanning multiple tracks, an embodiment may process each track of the I/O operation spanning multiple tracks separately. In other words, no matter how many track there are in connection with the I/O operation, a determination as to whether READ HIT or READ MISS processing is performed is made with respect to each individual track of the I/O operation so that an I/O operation involving "m" data tracks may be processed as "m" individual I/O operations each involving a different one of the "m" tracks. As an example, consider an I/O operation involving 2 tracks of data wherein the first track of data of the I/O operation is in cache and second track is not. Using the first alternative, READ HIT processing may be performed for the first track and the second track is processed separately in accordance with the flowchart, for example, of FIG. 5. Processing of the second track may result in READ MISS processing.

As a second alternative to the foregoing involving I/O operations spanning multiple tracks, an I/O operation spanning multiple tracks may be examined to determine whether all the data needed to service the I/O operation is in cache. If so, READ HIT processing may be performed as described herein, for example, with reference to FIG. 5 and description above. If a READ MISS is determined (e.g., not all the data needed to service the I/O operation is in cache), an embodiment may use one or more criteria to determine whether to process the I/O operation as a single READ MISS or whether to process each track of the I/O operation spanning multiple tracks separately (e.g., an I/O operation involving "m" data tracks may be processed as "m" individual I/O operations each involving a different one of the "m" tracks). Such criteria may include, for example, whether any of the data tracks associated with the READ MISS are in cache and whether a prefetch indicator for any one of these in-cache tracks is ON. As an example in one embodiment, each track of the READ MISS operation may be processed separately if any one track is in cache and has its prefetch indicator ON.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A non-transitory computer readable medium comprising code stored thereon that, when executed, performs a method for processing a data operation in a data storage system comprising:
   receiving, by a front-end component of the data storage system, the data operation from a requester; and
   in response to receiving the data operation, performing first processing by the front-end component, said first processing including:
      determining whether the data operation is a read operation requesting to read a data portion which results in a cache miss; and
      if said determining determines that said data operation is a read operation resulting in a cache miss, performing read miss processing, said read miss processing including determining whether said read operation is associated with a regular device or a non-regular device, and,
         if said read operation is associated with a regular device, instructing a back-end component of the data storage system to perform second processing, said second processing including sequential stream recognition processing and prefetching processing and retrieving data causing said cache miss from one or more physical devices of the data storage system, and
         otherwise, if said read operation is associated with a non-regular device, said sequential stream recognition processing and prefetch processing is performed by said front-end component in said first processing, and the second processing performed by the back-end component includes retrieving data causing said cache miss from one or more physical devices of the data storage system without performing the sequential stream recognition processing and prefetching processing,
      wherein said sequential stream recognition processing determines whether said data portion of said read operation is included in a sequential stream, wherein said prefetch processing includes determining an amount of data in a detected sequence to be prefetched, wherein said non-regular device is a device including at least one portion of a sequential stream from said requester's point of view which said back-end component cannot recognize and said front-end component can recognize, wherein said back-end component is a disk adapter that includes a first processor and accesses said one or more physical devices of the data storage system and said front-end component is a front-end adapter that includes a second processor different from the first processor, that receives the data operation over a network connection from the requester connected to the data storage system over the network connection, and that does not access said one or more physical devices of the data storage system, wherein the first processing performed by the front-end component is partitioned from the second processing performed by the back-end component, and wherein at least some logical device information corresponding to the read operation is available to the front-end component and is not available to the back-end component.

2. The non-transitory computer readable medium of claim 1, wherein said non-regular device is a device using one or more logical device mappings which are not available for use by said back-end component and which are available for use by said front-end component.

3. The non-transitory computer readable medium of claim 1, wherein the method further comprises performing processing, by the front end component, including:
   determining whether the data operation is a read operation wherein all data needed to service said read operation is included in cache; and
   if said determining determines that all data requested in connection with said read operation is in cache, performing read hit processing, said read hit processing including:
      determining whether a prefetch indicator for a first of one or more data portions associated with said read operation is on; and if said prefetch indicator is on, setting said prefetch indicator to off and performing additional processing to determine whether to prefetch additional data.

4. The non-transitory computer readable medium of claim 1, wherein said front-end component is a fibre-channel adapter.

5. The non-transitory computer readable medium of claim 1, wherein said sequential stream recognition processing includes:
  determining whether each of one or more data portions occurring immediately prior to data of said read operation is in cache;
  if each of said one or more data portions is not in cache, determining that no sequential stream exists; and
  if each of said one or more data portions is in cache, determining an occurrence of a sequential stream, said sequential stream including said one or more data portions and said data portion from said read operation resulting in said cache miss.

6. The non-transitory computer readable medium of claim 5, wherein said one or more data portions is a number of data portions selected in accordance with a selected sequence length.

7. The non-transitory computer readable medium of claim 5, wherein said step of determining whether each of one or more data portions occurring immediately prior to said data of said read operation is in cache includes examining one or more indicators included in a table, said table including an entry associated with each of said one or more data portions, said entry including an indicator indicating whether a cache slot is associated with said each data portion, and wherein said step of determining whether each of one or more data portions is in cache includes, for each data portion associated with a cache slot, examining a bitmap in a header of said cache slot, said bitmap indicating what data of said each data portion is stored in said cache slot.

8. The non-transitory computer readable medium of claim 5, wherein the additional data portions to prefetch are included in said sequential stream immediately following said data of said read operation; and instructing said back-end component to store said additional data portions being prefetched in cache.

9. A system comprising:
  a processor; and
  a memory comprising instructions stored therein that, when executed, performs a method for processing a data operation in a data storage system comprising:
    receiving, by a front-end component of the data storage system, the data operation from a requester; and
    in response to receiving the data operation, performing first processing by the front-end component, said first processing including:
      determining whether the data operation is a read operation requesting to read a data portion which results in a cache miss; and
      if said determining determines that said data operation is a read operation resulting in a cache miss, performing read miss processing, said read miss processing including determining whether said read operation is associated with a regular device or a non-regular device, and,
        if said read operation is associated with a regular device, instructing a back-end component of the data storage system to perform second processing, said second processing including sequential stream recognition processing and prefetching processing and retrieving data causing said cache miss from one or more physical devices of the data storage system, and
        otherwise, if said read operation is associated with a non-regular device, said sequential stream recognition processing and prefetch processing is performed by said front-end component in said first processing, and the second processing performed by the back-end component includes retrieving data causing said cache miss from one or more physical devices of the data storage system without performing the sequential stream recognition processing and prefetching processing,
      wherein said sequential stream recognition processing determines whether said data portion of said read operation is included in a sequential stream, wherein said prefetch processing includes determining an amount of data in a detected sequence to be prefetched, wherein said non-regular device is a device including at least one portion of a sequential stream from said requester's point of view which said back-end component cannot recognize and said front-end component can recognize, wherein said back-end component is a disk adapter that includes a first processor and accesses said one or more physical devices of the data storage system and said front-end component is a front-end adapter that includes a second processor different from the first processor, that receives the data operation over a network connection from the requester connected to the data storage system over the network connection, and that does not access said one or more physical devices of the data storage system, wherein the first processing performed by the front-end component is partitioned from the second processing performed by the back-end component, and wherein at least some logical device information corresponding to the read operation is available to the front-end component and is not available to the back-end component.

10. The system of claim 9, wherein said non-regular device is a device using one or more logical device mappings which are not available for use by said back-end component and which are available for use by said front-end component.

11. The system of claim 9, wherein the method further comprises performing processing, by the front end component, including:
  determining whether the data operation is a read operation wherein all data needed to service said read operation is included in cache; and
  if said determining determines that all data requested in connection with said read operation is in cache, performing read hit processing, said read hit processing including:
    determining whether a prefetch indicator for a first of one or more data portions associated with said read operation is on; and
    if said prefetch indicator is on, setting said prefetch indicator to off and performing additional processing to determine whether to prefetch additional data.

12. The system of claim 9, wherein said front-end component is a fibre-channel adapter.

13. The system of claim 9, wherein said sequential stream recognition processing includes:

determining whether each of one or more data portions occurring immediately prior to data of said read operation is in cache;
if each of said one or more data portions is not in cache, determining that no sequential stream exists; and
if each of said one or more data portions is in cache, determining an occurrence of a sequential stream, said sequential stream including said one or more data portions and said data portion from said read operation resulting in said cache miss.

14. The system of claim 13, wherein said one or more data portions is a number of data portions selected in accordance with a selected sequence length.

15. The system of claim 13, wherein said step of determining whether each of one or more data portions occurring immediately prior to said data of said read operation is in cache includes examining one or more indicators included in a table, said table including an entry associated with each of said one or more data portions, said entry including an indicator indicating whether a cache slot is associated with said each data portion, and wherein said step of determining whether each of one or more data portions is in cache includes, for each data portion associated with a cache slot, examining a bitmap in a header of said cache slot, said bitmap indicating what data of said each data portion is stored in said cache slot.

16. The system of claim 13, wherein the additional data portions to prefetch are included in said sequential stream immediately following said data of said read operation; and instructing said back-end component to store said additional data portions being prefetched in cache.

17. A data storage system comprising:
a processor;
one or more physical devices;
a front-end component;
a back-end component; and
a non-transitory computer readable medium comprising code stored thereon that, when executed, performs a method for processing a data operation in the data storage system comprising:
  receiving, by the front-end component of the data storage system, the data operation from a requester; and
  in response to receiving the data operation, performing first processing by the front-end component, said first processing including:
    determining whether the data operation is a read operation requesting to read a data portion which results in a cache miss; and
    if said determining determines that said data operation is a read operation resulting in a cache miss, performing read miss processing, said read miss processing including determining whether said read operation is associated with a regular device or a non-regular device, and,
      if said read operation is associated with a regular device, instructing the back-end component of the data storage system to perform second processing, said second processing including sequential stream recognition processing and prefetching processing and retrieving data causing said cache miss from the one or more physical devices of the data storage system, and otherwise, if said read operation is associated with a non-regular device, said sequential stream recognition processing and prefetch processing is performed by said front-end component in said first processing, and the second processing performed by the back-end component includes retrieving data causing said cache miss from one or more physical devices of the data storage system without performing the sequential stream recognition processing and prefetching processing,
    wherein said sequential stream recognition processing determines whether said data portion of said read operation is included in a sequential stream, wherein said prefetch processing includes determining an amount of data in a detected sequence to be prefetched, wherein said non-regular device is a device including at least one portion of a sequential stream from said requester's point of view which said back-end component cannot recognize and said front-end component can recognize, wherein said back-end component is a disk adapter that includes a first processor and accesses said one or more physical devices of the data storage system and said front-end component is a front-end adapter that includes a second processor different from the first processor, that receives the data operation over a network connection from the requester connected to the data storage system over the network connection, and that does not access said one or more physical devices of the data storage system, wherein the first processing performed by the front-end component is partitioned from the second processing performed by the back-end component, and wherein at least some logical device information corresponding to the read operation is available to the front-end component and is not available to the back-end component.

18. The data storage system of claim 17, wherein said non-regular device is a device using one or more logical device mappings which are not available for use by said back-end component and which are available for use by said front-end component.

19. The data storage system of claim 17, wherein the method further comprises performing processing, by the front end component, including:
determining whether the data operation is a read operation wherein all data needed to service said read operation is included in cache; and
if said determining determines that all data requested in connection with said read operation is in cache, performing read hit processing, said read hit processing including:
  determining whether a prefetch indicator for a first of one or more data portions associated with said read operation is on; and
  if said prefetch indicator is on, setting said prefetch indicator to off and performing additional processing to determine whether to prefetch additional data.

20. The data storage system of claim 17, wherein said front-end component is a fibre-channel adapter.

* * * * *